United States Patent
Hosaka

(10) Patent No.: US 8,650,419 B2
(45) Date of Patent: Feb. 11, 2014

(54) STORAGE APPARATUS AND ITS CONTROL METHOD

(75) Inventor: Fumiaki Hosaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 13/002,632

(22) PCT Filed: Dec. 20, 2010

(86) PCT No.: PCT/JP2010/007386
§ 371 (c)(1),
(2), (4) Date: Jan. 4, 2011

(87) PCT Pub. No.: WO2012/085962
PCT Pub. Date: Jun. 28, 2012

(65) Prior Publication Data
US 2012/0159210 A1  Jun. 21, 2012

(51) Int. Cl.
*G06F 1/26* (2006.01)
(52) U.S. Cl.
USPC .......................................................... 713/320
(58) Field of Classification Search
USPC .......................................................... 713/320
See application file for complete search history.

(56) References Cited

U.S. PATENT DOCUMENTS

| | | | | |
|---|---|---|---|---|
| 6,127,809 A | * | 10/2000 | Kates et al. | 320/134 |
| 2003/0085624 A1 | * | 5/2003 | Kadoi et al. | 307/64 |
| 2004/0054851 A1 | * | 3/2004 | Acton et al. | 711/118 |
| 2007/0194750 A1 | * | 8/2007 | Eager et al. | 320/110 |
| 2008/0005474 A1 | * | 1/2008 | Long | 711/118 |
| 2009/0077408 A1 | * | 3/2009 | Wong | 713/340 |
| 2009/0164825 A1 | * | 6/2009 | Sartain | 713/340 |
| 2009/0276643 A1 | * | 11/2009 | Saito | 713/300 |
| 2009/0300374 A1 | | 12/2009 | Mori | |
| 2010/0229018 A1 | * | 9/2010 | Hutchison et al. | 713/340 |

FOREIGN PATENT DOCUMENTS

JP  2009-294802  12/2009

OTHER PUBLICATIONS

PCT International Search Report and Written Opinion on application No. PCT/JP2010/007386 mailed Sep. 13, 2011; 11 pages.

* cited by examiner

*Primary Examiner* — Chun Cao
*Assistant Examiner* — Robert Cassity
(74) *Attorney, Agent, or Firm* — Foley & Lardner LLP

(57) ABSTRACT

The charge capacity of a battery for supplying electric power to a volatile memory and a nonvolatile memory is increased without increasing the power source capacity.
A control unit for controlling data input/output processing on a storage device is configured by combining a plurality of units which become load on a power source; and at the time of power interruption of a power source, the control unit saves data and information, which are stored in a volatile memory, to a nonvolatile memory. A battery charged by the power source supplies electric power to the volatile memory and the nonvolatile memory at the time of the power interruption. When the electric power is supplied from the power source to the control unit at the time of power recovery after the power interruption, a main controller selects an activation target unit, which is to be activated, from among the plurality of units belonging to the control unit and controls activation of the selected activation target unit. A battery controller controls a charging current supplied to the battery based on surplus power indicating a difference between total power consumption by the selected activation target unit and a capacity of the power source.

11 Claims, 20 Drawing Sheets

| Processing Name | Processing Content | MP | Host I/F | HDD I/F | CM |
|---|---|---|---|---|---|
| Offline | I/O not performed | Inhibit | Inhibit | Inhibit | Inhibit |
| Online | I/O performed | Dualization | Dualization | Select | Dualization |
| System being restored | Collection copy and HDD maintenance, etc. | Select | Select | Dualization | Inhibit |
| Backup | Backup to tapes, etc. | Select | Select | Dualization | Inhibit |
| Migration | Data migration to another system | Select | Select | Dualization | Inhibit |

FIG.7

| | UNIT TYPE | ELECTRIC POWER [W] | CONFIGURATION INFORMATION | ACTIVATION INHIBITING FLAG |
|---|---|---|---|---|
| 420 | MP | 100 | 2 | |
| 422 | CHA-A | 80 | 2 | |
| 424 | CHA-B | 50 | 0 | |
| 426 | DKA | 50 | 4 | |
| 428 | SW | 50 | 2 | |
| 430 | CM | 50 | 4 | |
| 432 | SVP | 30 | 1 | |
| 434 | FAN | 100 | 1 | |

FIG.15

| | UNIT TYPE | STOP | STATE 1 | STATE 2 | STATE 3 | STATE 4 | STATUS |
|---|---|---|---|---|---|---|---|
| 520 | MP | 0 | 50 | 75 | 50 | 100 | |
| 522 | CHA-A | 0 | 40 | 60 | 40 | 80 | |
| 524 | CHA-B | 0 | 25 | 35 | 25 | 50 | |
| 526 | DKA | 0 | 25 | 35 | 25 | 50 | |
| 528 | SW | 0 | 25 | 35 | 25 | 50 | |
| 530 | CM | 0 | 25 | 35 | 25 | 50 | |
| 532 | SVP | 0 | 10 | 20 | 30 | 30 | |
| 534 | FAN | 0 | 100 | 100 | 100 | 100 | |

500 — 502 (UNIT TYPE), 504 (STOP), 506 (STATE 1), 508 (STATE 2), 510 (STATE 3), 512 (STATE 4), 514 (STATUS)

STORAGE APPARATUS AND ITS CONTROL METHOD

TECHNICAL FIELD

The present invention relates to a storage apparatus having a function that saves data stored in a volatile memory to a nonvolatile memory at the time of power interruption and returns the data stored in the nonvolatile memory to the volatile memory and resumes business activities at the time of power recovery; and a method for controlling such a storage apparatus.

BACKGROUND ART

A storage apparatus includes a cache memory for temporarily storing data. In response to a write access from a host computer to a disk drive, the storage apparatus writes write data to the cache memory, upon which it notifies the host computer of the completion of write processing; and in response to a read access from the host computer to the disk drive, the storage apparatus reads data from the cache memory on condition that the read data has a cache hit. As a result, high-speed access is realized.

However, since the cache memory is often composed of a volatile memory, if power supply from a power source to the cache memory stops due to, for example, a power failure, data in the cache memory sometimes may sometimes be loss. Therefore, a large-capacity battery is mounted in the storage apparatus, so that if the power supply from the power source to the cache memory stops due to, for example a power failure, the large-capacity battery supplies the electric power to the cache memory, thereby preventing destruction of data in the cache memory even in the case of a power failure and allowing business activities to continue based on the data in the cache memory.

However, if the large-capacity battery is mounted in the storage apparatus, the cost of the storage apparatus increases by a cost amount of the mounted large-capacity battery. Also, even if the large-capacity battery is used, the capacity of the battery is limited. So, if the power interruption duration due to the power failure increases, there may be no other choice but the data in the cache memory may be destroyed and the business activities may have to be stopped.

On the other hand, if a small-capacity, small-sized battery that can be charged from the power source is mounted in the storage apparatus, it is possible to curb an increase in the cost as opposed to the case of mounting the large-capacity battery. In this case, it is possible to adopt a method of: saving data and information, which are stored in the volatile memory, to the nonvolatile memory at the time of power interruption caused by the occurrence of a power failure; and, at the time of power recovery when the power failure is solved, supplying the electric power from the small battery to the volatile memory, returning the data and information, which are stored in the nonvolatile memory, to the volatile memory, and resuming the business activities based on the data and information returned to the volatile memory.

When activating the storage apparatus under the circumstances described above as disclosed in Patent Literature 1, it is possible to adopt a method of selecting and activating two or more activation control units, whose power consumption of the entire load as recognized by the power source is equal to or less than specified electric power that is less than the maximum electric power that can be supplied by the power source, from among a plurality of activation control units.

CITATION LIST

Patent Literature

PTL 1: Japanese Patent Application Laid-Open (Kokai) Publication No. 2009-294802

SUMMARY OF INVENTION

Technical Problem

If with the storage apparatus in which the small battery is mounted, the data and information stored in the volatile memory are saved to the nonvolatile memory at the time of power interruption where the supply of electric power from the power source is interrupted, and if at the time of power recovery when the supply of the electric power is resumed the electric power is supplied from the small battery to the volatile memory and the data and information stored in the nonvolatile memory are returned to the volatile memory, and the business activities are resumed based on the data and information returned to the volatile memory, a sufficient charge capacity for the small battery cannot sometimes be charged at the time of recovery even merely by adopting the method disclosed in Patent Literature 1.

For example, if the power interruption duration is long and a power supply line connecting the power source and the small battery is interrupted for a long time, the charge capacity of the small battery reduces; and even if the small battery is charged from the power source at the time of the power recovery, the small battery cannot sometimes secure the sufficient charge capacity.

If the small battery fails to secure the sufficient charge capacity at the time of the power recovery, it is impossible to ensure returning of the data and information stored in the nonvolatile memory to the volatile memory. So, it is necessary to secure the sufficient charge capacity for the small battery in order to immediately resume business activities at the time of the power recovery.

For example, the sufficient charge capacity is required for the small battery to supply electric power to a shared memory during execution of processing for returning, for example, directory information and system configuration information, which are stored in the nonvolatile memory, to the shared memory (volatile memory) in order to immediately enable access from the host computer at the time of the power recovery.

Furthermore, the sufficient charge capacity is required for the small battery to supply electric power to the cache memory during the execution of processing for returning the data stored in the nonvolatile memory to the cache memory (volatile memory) in order to enhance access performance.

Under this circumstance, it is possible to reduce charge time for the small battery by increasing the power source capacity of the storage apparatus and increasing the charging current to the small battery. However, in the case of the above-described configuration, the cost increases as the storage apparatus is upsized. Furthermore, extension of facilities is required in order to increase the capacity of the power source; and the extension of facilities itself may sometimes become difficult.

The present invention was devised in light of the problems of the above-described conventional techniques. It is an object of the invention to provide a storage apparatus capable of increasing the charge battery of a battery for supplying electric power to a volatile memory and a nonvolatile memory without increasing the power source capacity; and a method for controlling such a storage apparatus.

Solution to Problem

In order to achieve the above-described object, the present invention is characterized in that a control unit for controlling data input/output processing on a storage device based on an access request is configured by combining a plurality of units which become load on a power source; and prior to returning at least either data or information stored in a nonvolatile memory to a volatile memory, only an activation target unit, which is to be activated, from among the plurality of units belonging to the control unit is selected and activated and a battery is charged based on surplus power indicating a difference between the total power consumption by the selected activation target unit and the capacity of the power source, thereby increasing a charge capacity of the battery. Under this circumstance, the activation of the activation target unit can be controlled by dividing it into a plurality of states.

Advantageous Effects of Invention

According to this invention, the charge capacity of a battery for supplying electric power to a volatile memory and a nonvolatile memory can be increased without increasing the power source capacity.

BRIEF DESCRIPTION OF DRAWINGS

FIG. 6 is a configuration diagram of an operation management table.

FIG. 7 is a configuration diagram of a unit management table.

FIG. 15 is a configuration diagram of a status management table.

DESCRIPTION OF EMBODIMENTS

An embodiment of the present invention will be explained with reference to the attached drawings.

First Embodiment

This embodiment is designed so that prior to execution of processing for returning information stored in a nonvolatile memory to a shared memory and data stored in the nonvolatile memory to a cache memory at the time of power recovery of a power source, an activation target unit, which is to be activated, from among a plurality of units belonging to a control unit is selected and activated, so that power consumption by the entire storage apparatus is reduced than a case where all the units are activated, thereby producing surplus power from the power source, increasing a charge capacity of a battery by means of the surplus power, and reducing charge time for the battery.

Figure 1:
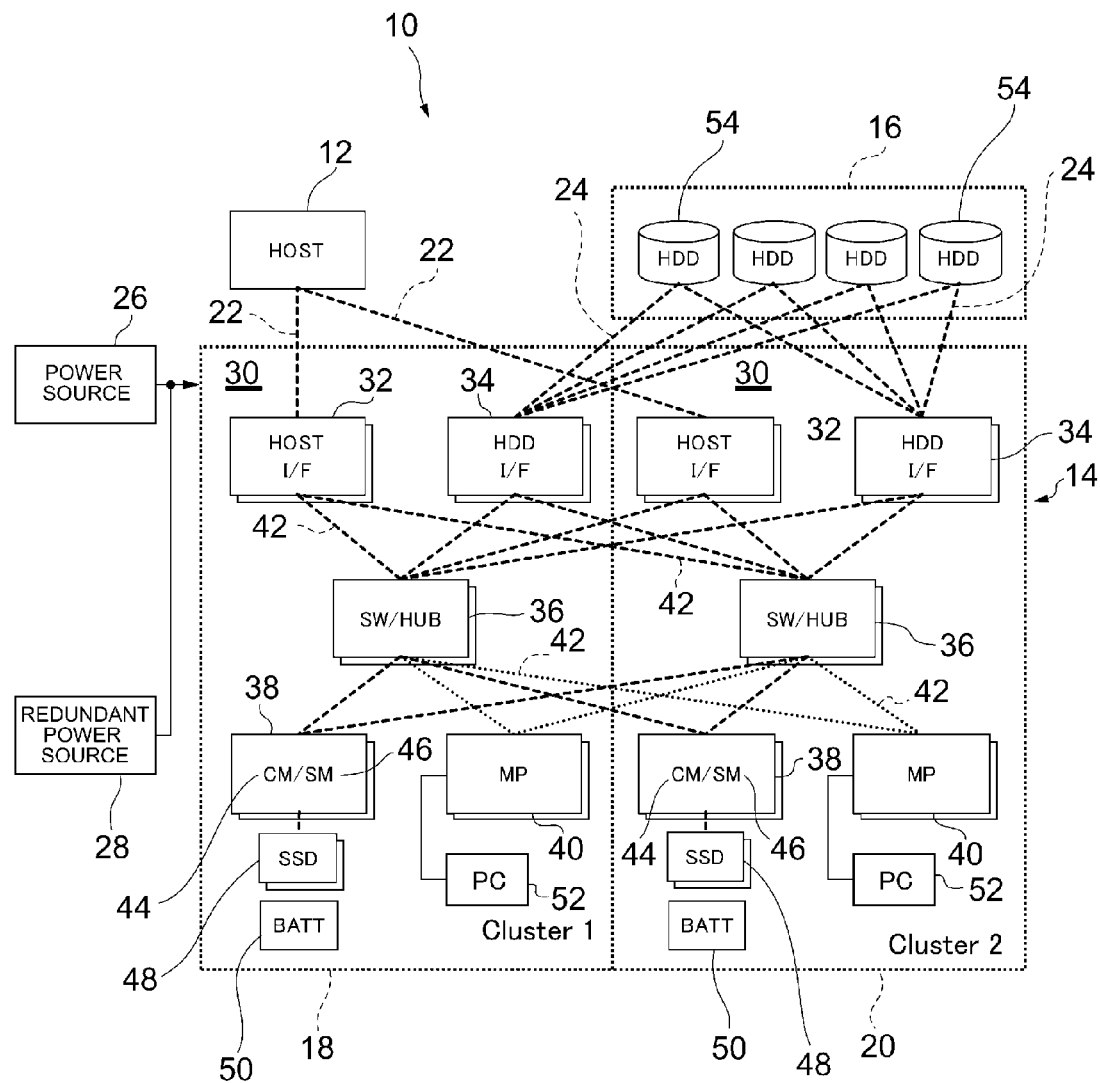
FIG. 1 is a block configuration diagram showing the overall configuration of a storage system to which the present invention is applied.

FIG. 1 is a block configuration diagram of a storage system to which the present invention is applied. Referring to FIG. 1, a storage system 10 includes a host computer 12 and a storage apparatus (storage subsystem) 14.

The storage apparatus 14 includes a storage device 16 and a plurality of clusters 18, 20. Each cluster 18, 20 is connected via a network 22 to a host computer 12 and is also connected via a network 24 to the storage device 16.

Electric power is supplied from, for example, a power source unit 26, whose power supply objects (power supply range) are the clusters 18, 20 and the storage device 16, to each cluster 18, 20 and electric power is also supplied from a redundant power source unit 28 which is a redundant power source. It should be noted that when the power source unit 26 operates normally, the electric power can be supplied from the power source unit 26 to each cluster 18, 20; and when the power source unit 26 is in an abnormal state, the electric power can be supplied from the redundant power source unit 28 to each cluster 18, 20.

Each cluster 18, 20 is constituted from the same components in order to provide dual storage apparatuses 14. A control unit 30 for controlling data input/output processing on the storage device 16 based on an access request (read access request or write access request) from the host computer 12 which is an access requestor is placed in each cluster 18, 20.

The control unit 30 for each cluster 18, 20 is configured by combining a plurality of units which become load on the power source such as the power source unit 26 and each unit is configured by including a large scale integrated circuit (LSI) as a main component.

Specifically speaking, each control unit 30 includes: a plurality of host interface units 32; a plurality of HDD (Hard Disk Drive) interface units (disk interface units) 34; a plurality of switch units 36; a plurality of memory units 38; and a plurality of microprocessor units (MP units) 40. Each unit is connected via dual data buses 42 to each switch unit 36, each host interface unit 32 is connected via the network 22 to the host computer 12, and each HDD interface unit 34 is connected via the network 24 to the storage device 16.

A cache memory 44 composed of a volatile memory and a shared memory 46 composed of a volatile memory are placed in each memory unit 38. Furthermore, an SSD (Solid State Drive) 48 composed of a nonvolatile memory is connected to each memory unit 38. The electric power is supplied from a battery 50 to the cache memory 44, the shared memory 46, and the SSD 48. The battery 50 is charged from at least either the power source unit 26 or the redundant power source unit 28.

Furthermore, a maintenance PC (Personal Computer) 52 used by, for example, a user to make various settings is connected to each microprocessor unit 40.

The host computer 12 includes, for example, a microprocessor, a memory, an I/O interface, and a display device (neither of which is shown in the drawing). The microprocessor issues commands and access requests to the storage apparatus 14 based on programs and data stored in the memory and sends information to, and receives information from, the storage apparatus 14 via the network 22 based on commands.

The storage device 16 is constituted from a plurality of HDDs 54 as storage unit. Under this circumstance, a logical device is allocated to at least part of a storage area for each HDD 54.

Each host interface unit 32 is a unit functioning as a host interface or a channel adapter for sending information to, and receiving information fro, the host computer 12 via the network 22. For example, the host interface unit 32 executes control for interpreting a command from the host computer 12 and transferring data from the host computer 12 via each switch unit 36 to each memory unit 38 and also executes control for fetching data from the HDDs 54 via each HDD interface unit 34 and each switch unit 36 and transferring the data to the host computer 12.

Each HDD interface unit 34 is a unit functioning as a disk adapter or a disk interface, sends data to, and receives data from, the storage device 16, controls data transfer to/from each memory unit 38 via each switch unit 36, and controls data transfer to/from each host interface unit 32 via each switch unit 36.

Each switch unit 36 is a unit functioning as a line concentrator or a hub, connects each host interface unit 32, each HDD interface unit 34, each memory unit 38, and each microprocessor unit 40 via paths, and has a function sorting data to each unit.

The cache memory 44 placed in each memory unit 38 constitutes a storage area for temporarily storing data involved in processing of the microprocessor unit 40 and the shared memory 46 constitutes a storage area for storing directory information as management information to manage the cache memory 44 and configuration information (system configuration information) about the system including the clusters 18, 20 and the storage device 16.

The SSD 48 constitute a storage area which is a save location for saving data stored in the cache memory 48 and information stored in the shared memory 46.

The battery 50 is charged from the power source unit 26 or the redundant power source unit 28 via a power supply line 100 and functions as a power supply source or an auxiliary power source for supplying the electric power to the SSD 48, the cache memory 44, and the shared memory 46 at the time of power interruption or power recovery. The battery 50 is configured by using, for example, an electric double layer capacitor, a hybrid capacitor, a lithium ion secondary battery, a nickel-mercury storage battery, or a lead storage battery. It should be noted that the power supply objects (power supply range) of the battery 50 are the SSD 48, the cache memory 44, and the shared memory 46, but a large scale integrated circuit (LSI) of each unit can be a power supply object.

Each microprocessor unit 40 contains a microprocessor (not shown in the drawing) and functions as a unit for supervising and controlling the entire control unit 30 based on processing by the microprocessor (MP).

Incidentally, the processing executed by the microprocessor contained in each microprocessor unit 40 may be hereinafter sometimes explained as processing by the microprocessor unit 40. Also, processing by a microprocessor in an unit other than the microprocessor unit 40 may be hereinafter sometimes explained as processing by each unit.

Figure 2:
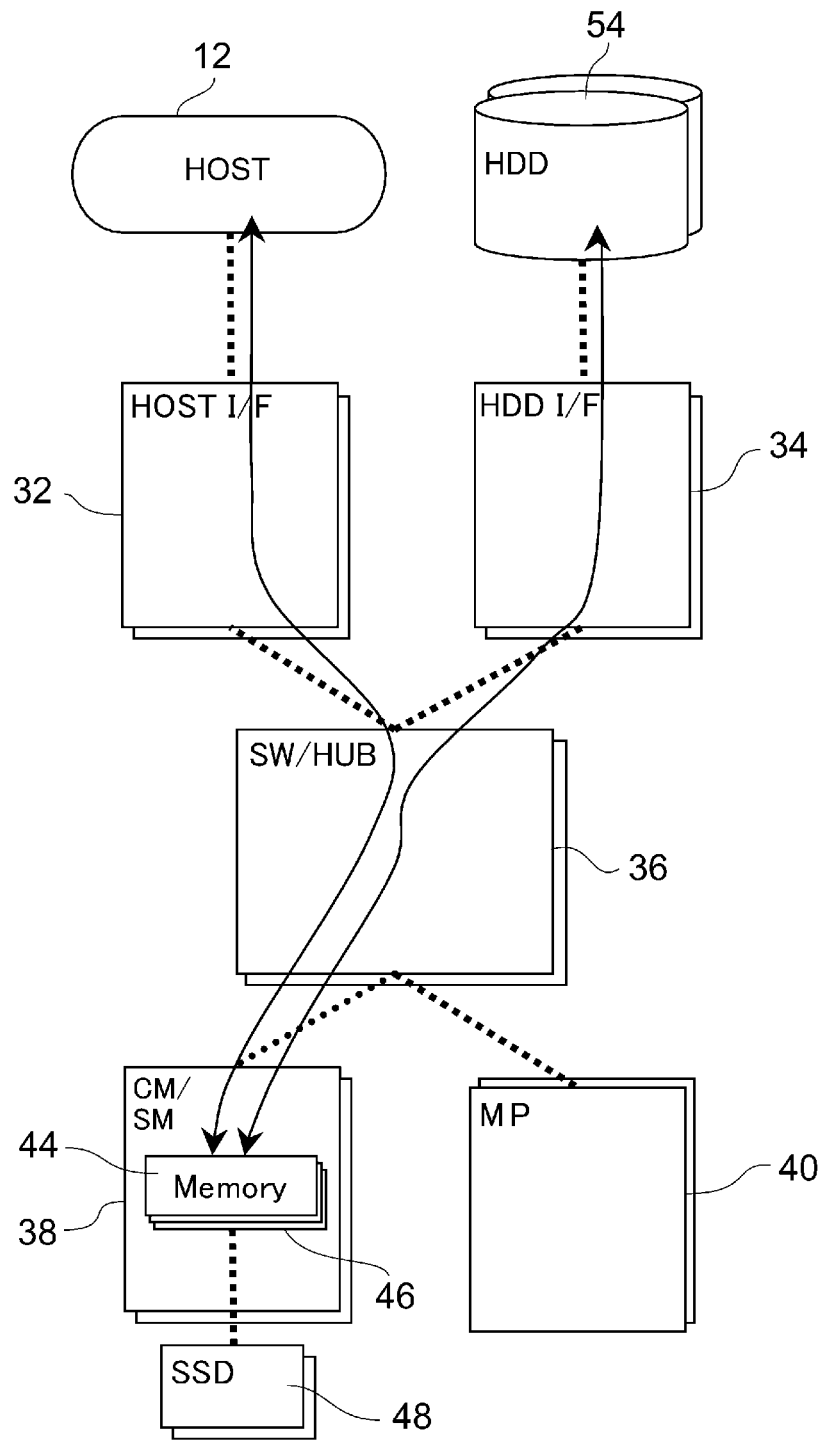
FIG. 2 is a block diagram explaining read/write processing of the storage system.

Next, the operation of the storage system 10 will be explained with reference to a block diagram in FIG. 2.

After the host computer 12 firstly issues a command, the host interface unit 32 receives the command. The host interface unit 32 interprets the command; and if the command is a write access request, the host interface unit 32 transfers the write access request via the switch unit 36 to the microprocessor unit 40. In response to the write access request, the microprocessor unit 40 writes the relevant write data via the switch unit 36 to the cache memory 44 for the memory unit 38; and on condition that the write data is written to the cache memory 44, the microprocessor unit 40 notifies the host computer 12 of the completion of the write access via the host interface unit 32.

Subsequently, the write data written to the cache memory 44 is written to the HDDs 54 via the switch unit 36 and the HDD interface unit 34 based on the processing by the microprocessor unit 40.

Next, if the host computer 12 issues a read access request as a command and this read access request is received by the host interface unit 32, the host interface unit 32 transfers the read access request via the switch unit 36 to the microprocessor unit 40. In response to the read access request, the microprocessor unit 40 searches for data in the cache memory 44; and if the relevant read data exists in the cache memory 44, the data in the cache memory 44 is sent as the read data to the host computer 12 via the host interface unit 32.

On the other hand, if the read data does not exist in the cache memory 44, the microprocessor unit 40 searches for data in the storage device 16 via the switch unit 36 and the HDD interface unit 34 and sends the data obtained by this search as the read data to the host computer 12 via the host interface unit 32.

Figure 3:
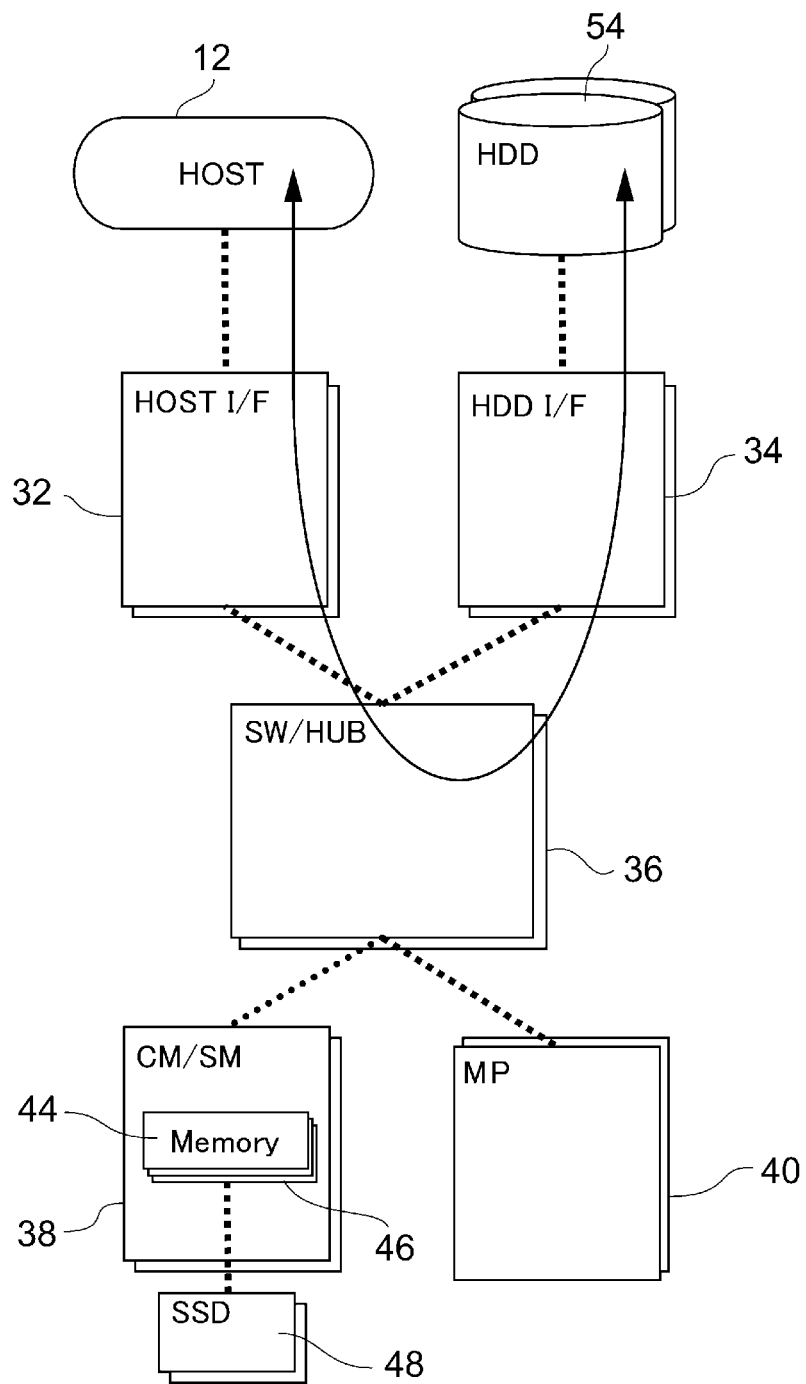
FIG. 3 is a block diagram explaining write-through processing of the storage system.

Next, write-through processing executed in the storage system 10 will be explained with reference to a block diagram in FIG. 3.

Firstly, if the host computer 12 issues a write access request as a command and this write access request is received by the host interface unit 32, the host interface unit 32 transfers the write access request via the switch unit 36 to the microprocessor unit 40. In response to the write access request, the microprocessor unit 40 accesses the cache memory 44.

In this case, the write data is data existing in the cache memory 44. However, if the write data is data which has not been written to the HDDs 54 for the storage device 16, the microprocessor unit 40 executes write-through processing for writing the write data to the HDDs 54 via the HDD interface unit 34 without writing the write data to the cache memory 44.

Furthermore, when the microprocessor unit 40 accesses the cache memory 44 and if a storage area for storing write data does not exist in the cache memory 44, the microprocessor unit 40 executes the write-through processing for writing the write data to the HDDs 54 via the HDD interface unit 34.

Figure 4:
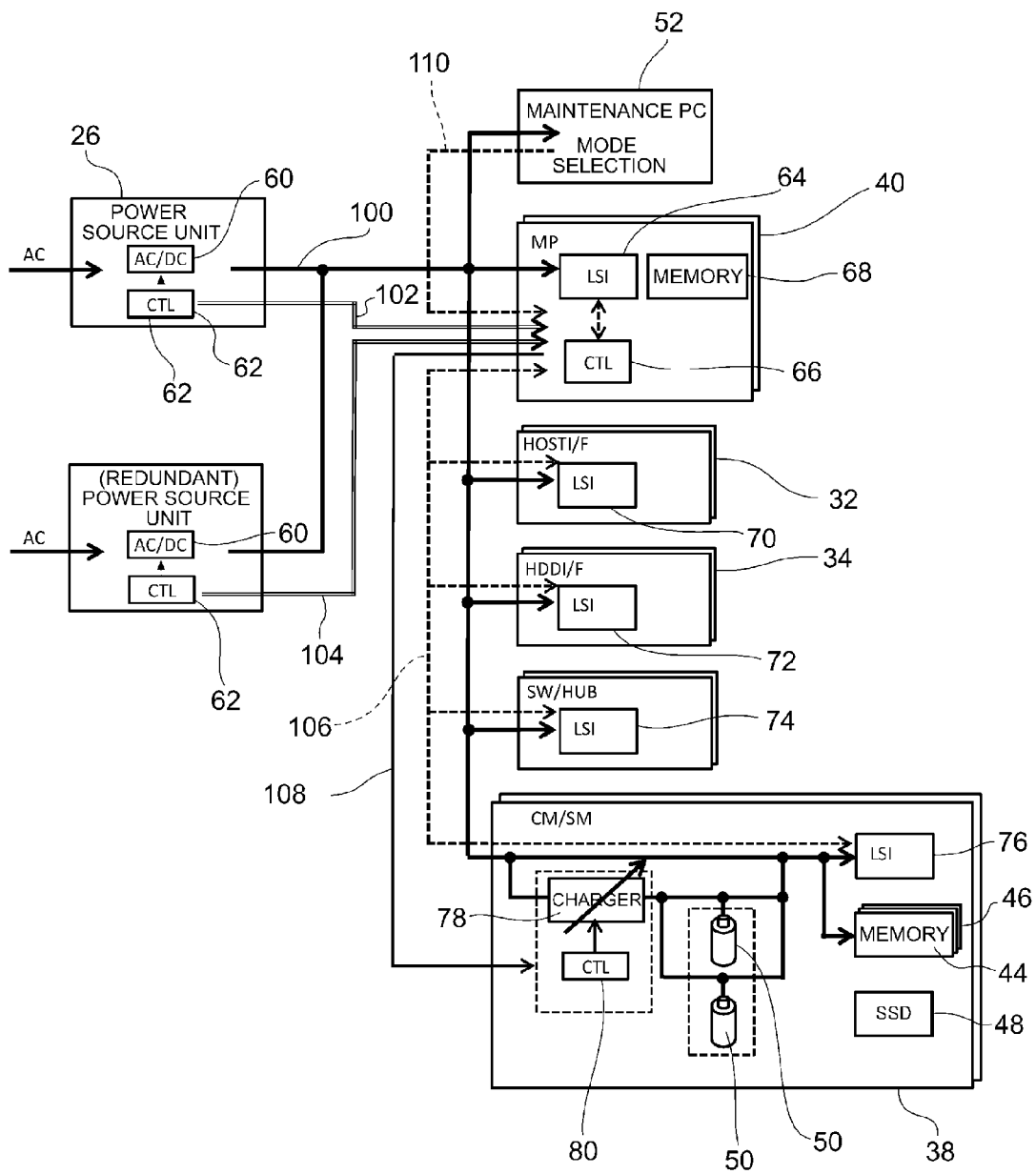
FIG. 4 is a block configuration diagram explaining a power supply system of the storage apparatus.

Next, FIG. 4 shows a power supply system in the storage apparatus 14.

Each of the power source unit 26 and the redundant power source unit 28 includes an ac/dc converter 60 for converting an alternating current to a direct current and a power source controller 62 for controlling an output current from the ac/dc converter 60; and the output side of the ac/dc converter 60 is connected via the power supply line 100 to the maintenance PC 52, the microprocessor unit 40, the host interface unit 32, the HDD interface unit 34, the switch unit 36, and the memory unit 38, respectively.

In other words, output electric power from the power source unit 26 and the redundant power source unit 28 is supplied via the power supply line 100 to the maintenance PC 52 and each unit (the microprocessor unit 40, the host interface unit 32, the HDD interface unit 34, the switch unit 36, and the memory unit 38).

Each power source controller 62 judges the status of the power source unit 26 or the redundant power source unit 28, for example, whether the power source unit 26 or the redundant power source unit 28 is in a normal state or an abnormal state; and the power source controller 62 then transfers the judgment result as power source information 102, 104 to the microprocessor unit 40.

The microprocessor unit 40 includes: a data processing circuit 64 activated by receiving the supply of electric power from the power supply line 100; a main controller 66 for controlling activation (ON) or stop (OFF) of the data processing circuit 64, controlling the activation of the data processing circuit 64 by dividing it into a plurality of states, and monitoring the on-off status of the data processing circuit 64; and a memory 68 for storing information about various data, programs, or tables.

The data processing circuit 64 is configured by using a large scale integrated circuit (LSI); and, for example, a plurality of microprocessors (MP) for supervising and controlling each unit in the control unit 30, and a switch connecting the power supply line 100 and each microprocessor (neither of which is indicated in the drawing) are located in the data processing circuit 64.

The main controller 66 performs on-off control of the switch in the data processing circuit 64, monitors the on-off status of the switch, controls activation (ON) or stop (OFF) of a data processing circuit in another units in the control unit 30, controls the activation of the data processing circuit in another unit by dividing it into a plurality of states, and further monitors the on-off status of the data processing circuit in another unit.

Data processing circuits 70, 72, 74, 76 to be activated by receiving the supply of electric power from the power supply line 100 are located in the host interface unit 32, the HDD interface unit 34, the switch unit 74, and the memory unit 38, respectively.

Each data processing circuit 70, 72, 74, 76 is configured by using a large scale integrated circuit (LSI); and, for example, a microprocessor (MP) for executing data processing in each unit, and a switch connecting the power supply line 100 and the microprocessor (neither of which is indicated in the drawing) are located in each data processing circuit 70, 72, 74, 76.

On-off control of the switch for each data processing circuit 70, 72, 74, 76 is performed based on the on-off control information sent from the main controller 66 via a control line 106 and the activation of each data processing circuit 70, 72, 74, 76 is controlled by dividing the activation into a plurality of states. When this is performed, the on-off status of each data processing circuit 70, 72, 74, 76 is transferred via the control line 106 to the main controller 66.

Furthermore, a charger 78 for charging the battery 50 with the electric power from the power supply line 100, and a battery controller 80 for variably adjusting an output current from the charger 78, that is, a charging current for the battery 50, are located in the memory unit 38. This battery controller 80 is connected via a control line 108 to the main controller 60, variably adjusts the charging current for the battery 50 based on information from the main controller 66, monitors the charge capacity of the battery 50, and controls the charging current for the battery 50 in accordance with this monitoring result.

The maintenance PC 52 is connected via a control line 110 to the main controller 66 and transfers, for example, information about mode selection and various settings to the main controller 66 via the control line 110.

Figure 5:
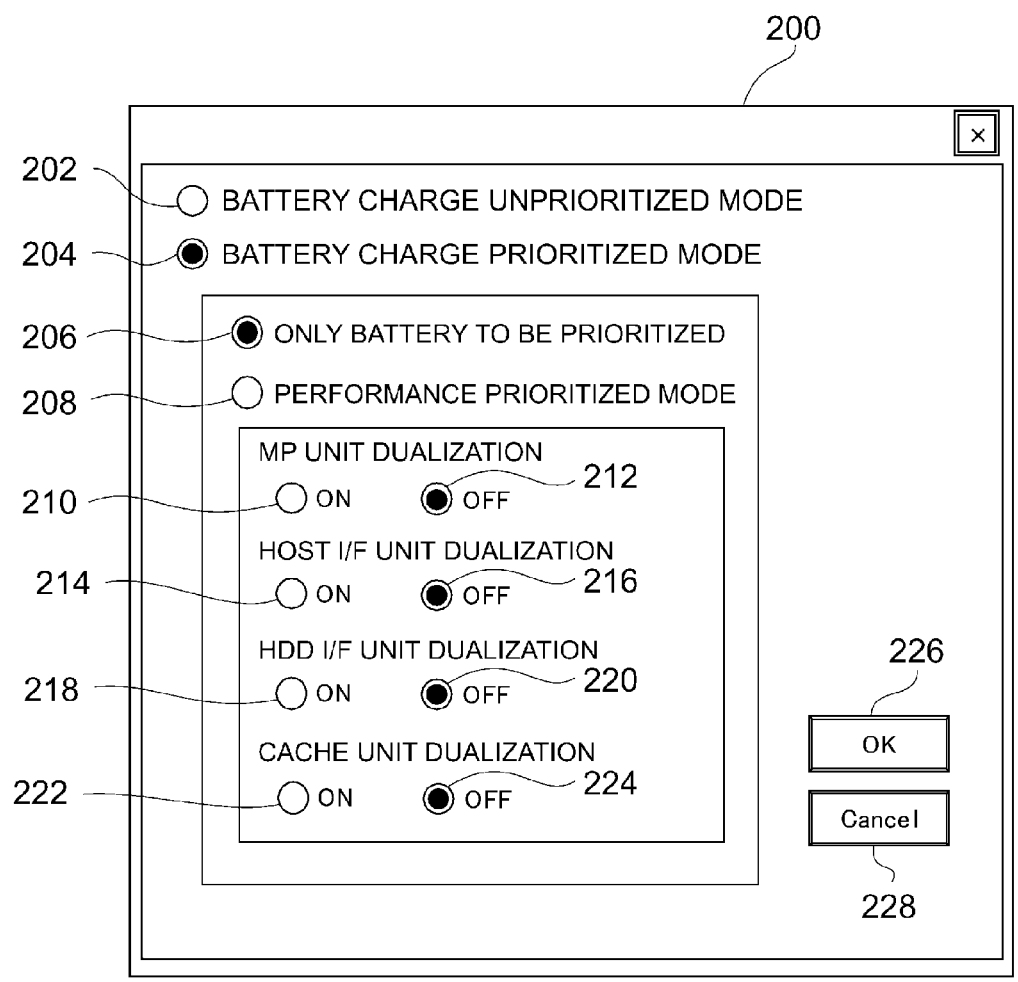
FIG. 5 is a configuration diagram showing a display example for a user setting screen.

Next, FIG. 5 shows the configuration of a user setting screen on the maintenance PC.

Referring to FIG. 5, a user setting screen 200 is configured as a screen for selecting a battery charge mode at the time of power recovery of the power source unit 60 after power interruption.

Specifically speaking, the user setting screen 200 includes: a selection area 202 for selecting a Battery Charge Unprioritized Mode; a selection area 204 for selecting a Battery Charge Prioritized Mode; a selection area 206 for selecting an Only Battery To Be Prioritized; and a selection area 208 for selecting a Performance Prioritized Mode.

As selection areas to be used when the Performance Prioritized Mode is selected in the selection area 208, an ON selection area 210 and an OFF selection area 212 are provided for dualization of the microprocessor unit 40 and an ON selection area 214 and an OFF selection area 216 are provided for dualization of the host interface unit 32. Also, an ON selection area 218 and an OFF selection area 220 are provided for dualization of the HDD interface unit 34. An ON selection area 222 and an OFF selection area 224 are provided for dualization of the cache memory 44.

Furthermore, the user setting screen 200 is provided with an OK button 226 to be used when the selected area is confirmed, and a cancellation button 228 to be used when the selected area is to be cancelled.

Information that is set by the user using the user setting screen 200 is transferred via the control line 110 to the main controller 66 and stored in the memory 68.

Next, FIG. 6 shows the configuration of an operation management table.

An operation management table 300 is stored, as a table for managing whether each unit should be used as an activation target unit or not, in the memory 68; and includes a processing name field 302, a processing content field 304, a microprocessor unit field 306, a host interface unit field 308, an HDD interface unit field 310, and a cache memory field 312.

Each entry in the processing name field 302 stores information about a processing name of processing to be executed by the storage system 10. For example, entry 320 stores Offline, entry 322 stores Online, entry 324 stores System Being Restored, entry 326 stores Backup, and entry 328 stores Migration.

Each entry in the processing content field 304 stores information about the processing content. For example, the entry 320 stores I/O Not Performed, the entry 322 stores information indicating I/O Performed, the entry 324 stores Collection Copy and HDD Maintenance, etc., the entry 326 stores information indicating Backup to Tapes, etc., and the entry 328 stores information indicating Data Migration to Another System.

Each of the microprocessor unit field 306, the host interface unit field 308, the HDD interface unit field 310, and the cache memory field 312 stores: information indicating Inhibit if it is unnecessary to supply the electric power from the power source to each unit or the cache memory 44; and information indicating Dualization if each unit or the cache memory 44 is used in a dualized state. Furthermore, if it is possible to select whether each unit or the cache memory 44 should be used as an activation target unit or not, each of the microprocessor unit field 306, the host interface unit field 308, the HDD interface unit field 310, and the cache memory field 312 stores information indicating Select.

Next, FIG. 7 shows the configuration of a unit management table.

A unit management table 400 is stored, as a table for managing, for example, power consumption by each unit, in the memory 68; and includes a unit type field 402, an electric power field 404, a configuration information field 406, and an activation inhibiting flag field 408.

Each entry in the unit type field 402 stores the name of each unit.

For example, entry 420 stores MP as the name of the microprocessor unit 40, entry 422 stores CHA-A as the name of the host interface unit 32 belonging to the cluster 18, and entry 424 stores information indicating CHA-B as the name of the host interface unit 32 belonging to the cluster 20.

Entry 426 stores information indicating DKA as the name of each HDD interface unit 34. Entry 428 stores information indicating SW as the name of the switch unit 36, and entry 430 stores information indicating CM as the name of the cache memory 44.

Entry 432 stores information indicating SVP as the name of the maintenance PC 52. Entry 434 stores information indicating FAN as the name of a cooler for cooling each unit.

Each entry in the electric power field 404 stores a numerical value of the power consumption previously calculated as power consumption (W) by, for example, each unit.

For example, the entry 420 stores 100, the entry 422 stores 80, each entry 424 through 430 stores 50, the entry 432 stores 30, and the entry 434 stores 100.

Each entry in the configuration information field 406 stores a numerical value of information about the number of, for example, each unit.

For example, each entry 420, 422 stores 2 as the number of the unit(s) is two; the entry 424 stores 0 as the number of the unit(s) is zero; the entry 426 stores 4 as the number of the unit(s) is four; the entry 428 stores 2 as the number of the unit(s) is two; the entry 430 stores 4 as the number of the cache memory/memories 44 is four; and each entry 432, 434 stores 1 as the number of the relevant element(s) is one.

Each entry in the activation inhibiting flag field 408 stores: ON when each unit is to be activated; and OFF if it is unnecessary to activate, for example, each unit.

Figure 8:
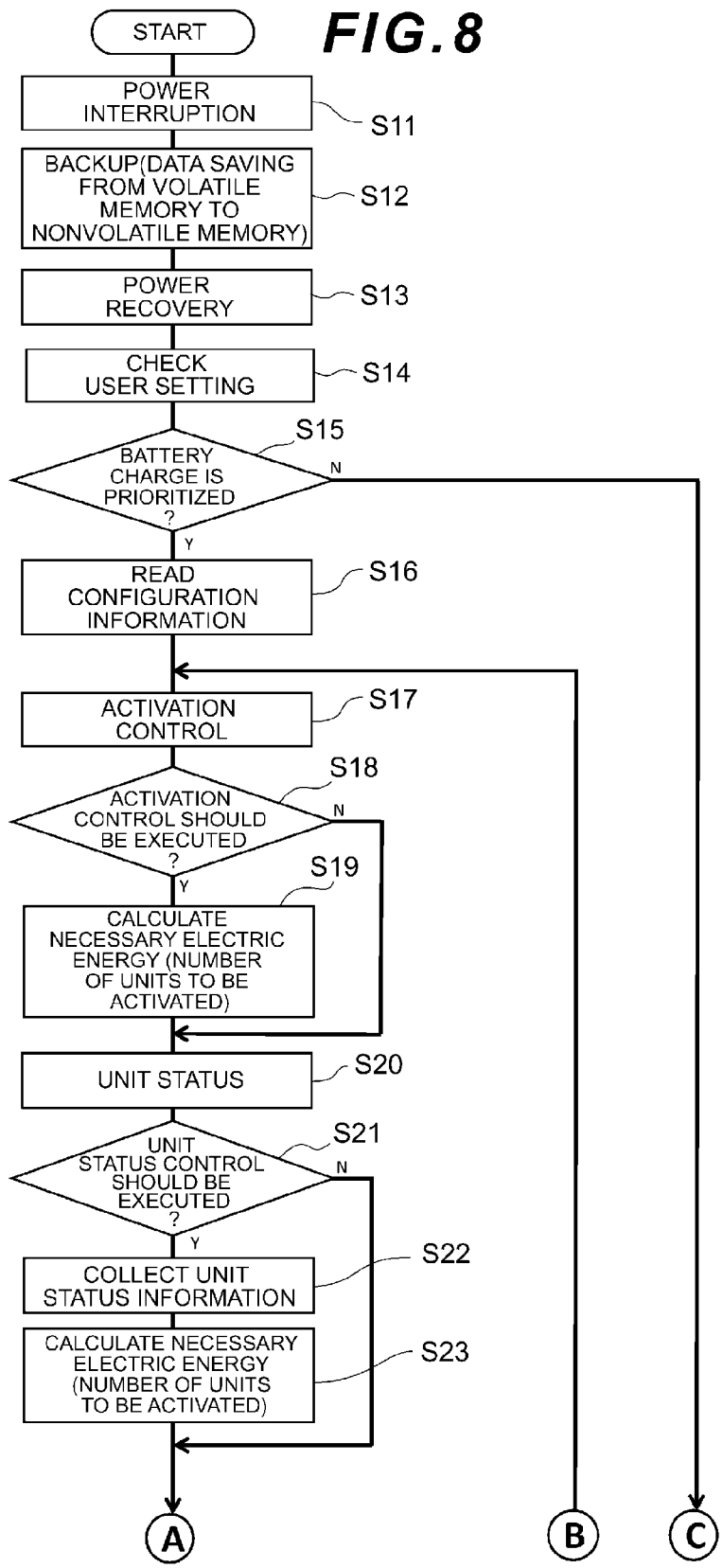
FIG. 8 is a flowchart illustrating the overall processing of the storage system.
Figure 9:
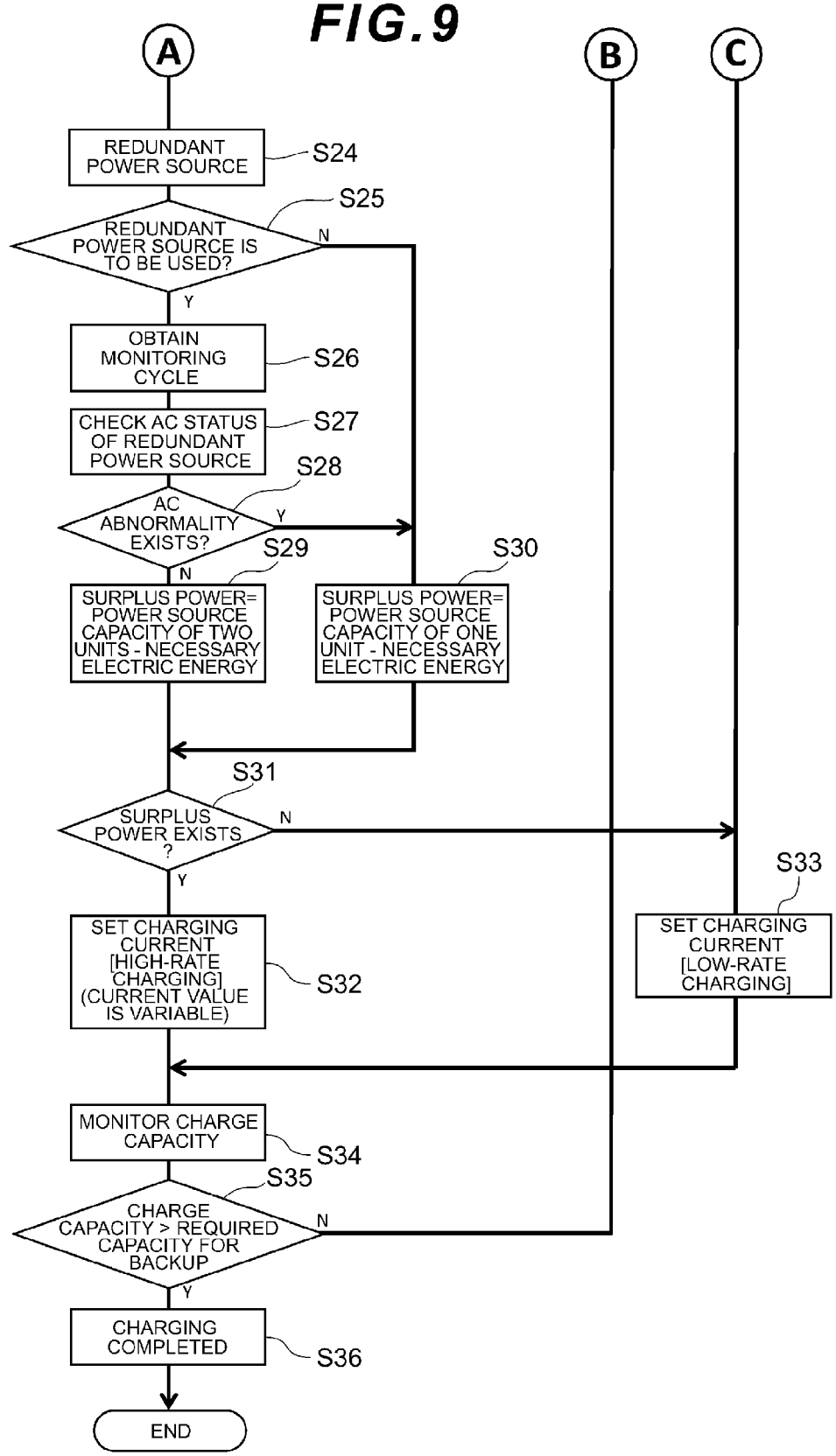
FIG. 9 is a flowchart illustrating the overall processing of the storage system.

Next, the processing content of the entire storage system will be explained with reference to flowcharts in FIG. 8 and FIG. 9.

Firstly, if the supply of electric power from the power source unit 26 to each cluster 18, 20 is interrupted while the power source unit 26 is operating normally, the power source controller 62 detects the power interruption and transfers the power source information 102 indicating the occurrence of the power interruption to the main controller 66 (S11).

As a result, the main controller 66 transfers control information indicating the occurrence of the power interruption to the data processing circuit 76 via the control line 106. Incidentally, the data processing circuits 64, 70, 72, 74, 76 can detect interruption of the supply of the electric power from the power supply line 100 (detects that the switch has been turned off) and judge that the power interruption has occurred.

When the power interruption occurs, the data processing circuit 76 executes backup processing for saving data, which is stored in the cache memory 44, and information, which is stored in the shared memory 46, to the SSD 48 respectively (S12).

Next, when the supply of the electric power is started after the interruption of the electric power supply from the power source unit 26 to each cluster 18, 20, the power source controller 62 detects the power recovery and transfers the power source information 102 indicating that the power source has entered a power recovery state, to the main controller 66 (S13). Incidentally, the data processing circuits 64, 70, 72, 74, 76 can detect the supply of the electric power from the power supply line 100 (detects that the switch has been turned on) and judge that the power has been recovered.

At the time of the power recovery, the main controller 66 searches the memory 68 and checks information that is set by the user (S14), and judges whether the battery charge is prioritized or not (S15). If it is determined that the battery charge is not prioritized, the processing proceeds to step S33; and if it is determined that the battery charge is prioritized, the main controller 66 reads the information in the configuration information field 406 from the unit management table 400 (S16).

Next, the main controller 66 collects necessary information for the activation control from the configuration information field 406 in the unit management table 400 (S17) and judges whether it is necessary to perform the activation control or not (S18). If it is determined that it is unnecessary to perform the activation control, the processing proceeds to step S20; and if it is determined that it is necessary to perform the activation control, the main controller 66 calculates a necessary electric power amount (necessary electric energy) to perform the activation control, based on the number of units to be activated (activation target units) (S19).

Subsequently, the main controller 66 starts processing relating to unit status control (S20) and judges whether the unit status control should be performed or not (S21). If it is determined that it is unnecessary to perform the unit status control, the processing proceeds to step S24; and if it is determined that it is necessary to perform the unit status control, the main controller 66 collects status information about each unit (S22) and calculates a necessary electric power amount (necessary electric energy) to activate the activation target unit(s) based on the status of the activation target units to be activated (S23).

Then, the main controller 66 starts processing for using the redundant power source (S24) and judges whether the redundant power source unit 28 which is the redundant power source is to be used or not (S25). If it is determined to not use the redundant power source, the processing proceeds to step S30; and if it is determined to use the redundant power source, the main controller 66 obtains a monitoring cycle for the redundant power source unit 28 and the power source unit 26 (S26), checks the power source status of the redundant power source unit 28 based on the power source information 104 (S27), and judges whether or not any abnormality exists in the power source unit 26 or the redundant power source unit 28 (S28).

If it is determined in this step that each power source unit is in a normal state, the main controller 66 calculates surplus power of both the power source units from a difference between the power source capacity of the two power source units and the necessary electric power (S29); and if it is determined that abnormality exists in either one of the power source units, the main controller 66 calculates surplus power of the normal power source unit from a difference between the power source capacity of the normal power source unit and the necessary electric energy (S30).

Next, the main controller 66 judges whether any surplus power exists or not (S31). If it is determined that the surplus power exists, the main controller 66 sets a setting value of a charging current that can be supplied from the two power source units or one power source unit to the battery 50 (a higher setting value than a case where the surplus power does not exist), based on the calculated surplus power (S32) and transfers information about this setting value to the battery controller 80. As a result, the battery controller 80 adjusts the output current of the charger 78 based on the setting value of the charging current and charges the battery 50 at a high rate.

On the other hand, if it is determined in step S31 that the surplus power does not exist or if it is determined in step S15 that the battery charge is not prioritized, the main controller 66 sets a setting value of a charging current that can be supplied from the power source unit 26 or the redundant power source unit 28 to the battery 50 (a lower setting value than a case where the surplus power exists), based on the calculated surplus power (for example, the surplus power=0) (S33) and transfers information about this setting value to the battery controller 80. As a result, the battery controller 80 adjusts the output current of the charger 78 based on the setting value of the charging current where no surplus power exists; and charges the battery 50 at a low rate.

Subsequently, the battery controller 80 monitors the charge capacity of the battery 50 (S34) and judges whether the charge capacity of the battery 50 is not less than the necessary charge capacity (for example, not less than a threshold) to maintain the backup processing by the data processing circuit 76 (S35). If it is determined that the charge capacity of the battery 50 is less than the charge capacity (less than the threshold) necessary for the backup processing by the data processing circuit 76, the processing returns to step S17; and if it is determined that the charge capacity of the battery 50 is not less than the charge capacity (not less than the threshold) necessary for the backup processing by the data processing circuit 76, the battery controller 80 completes charging of the battery 50 (S36) and terminates the processing in this routine.

After charging the battery 50 is completed, the backup processing for returning the data and information, which have been saved to the SSD 48, to the volatile memory is executed by the data processing circuit 76 and processing for resuming business activities based on the data and information returned to the volatile memory will be started. Under this circumstance, the backup processing for returning the data and information, which have been saved to the SSD 48, to the volatile memory can be also executed by the data processing circuit 64.

Figure 10:
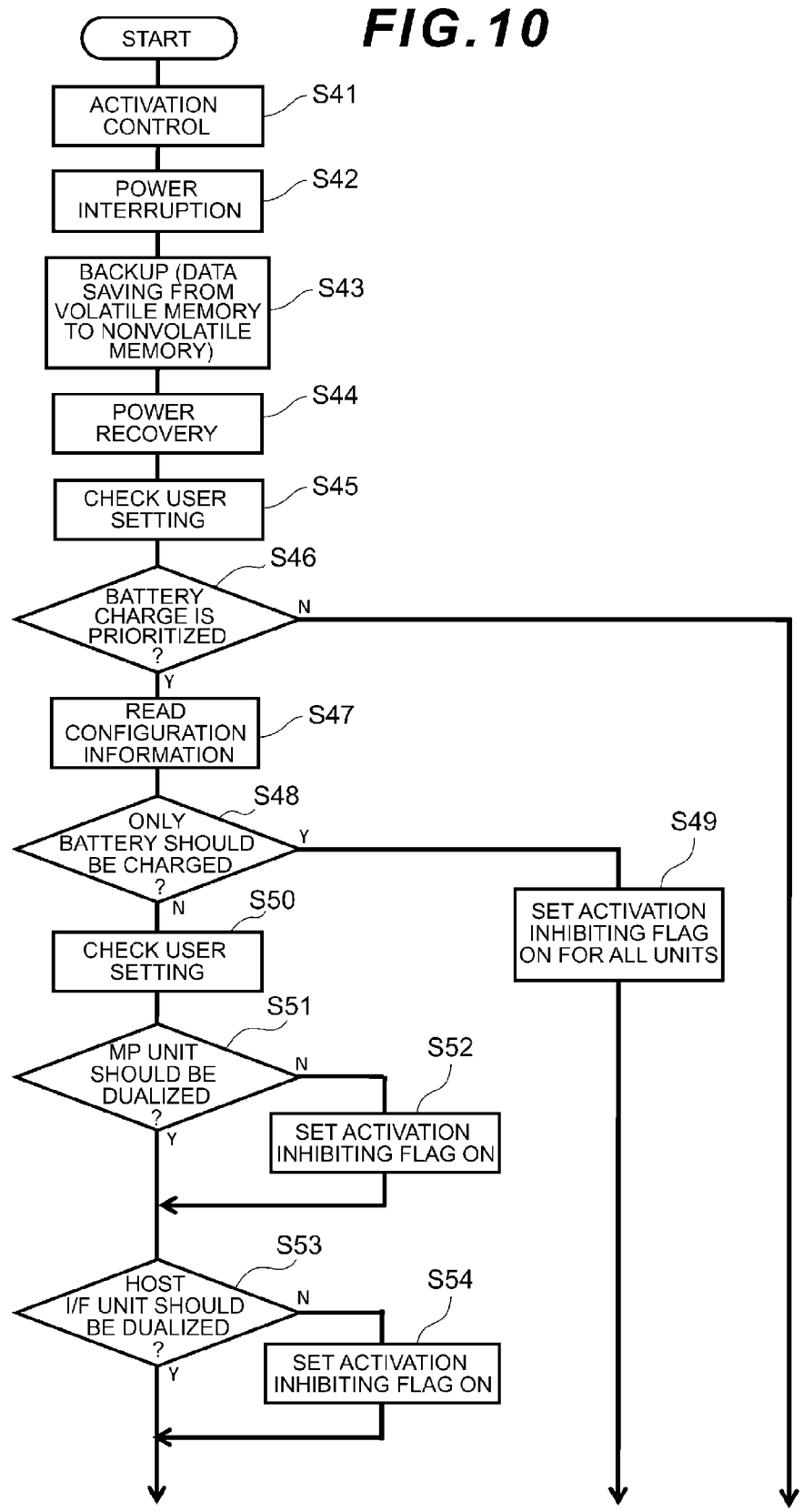
FIG. 10 is a flowchart illustrating activation control processing.
Figure 11:
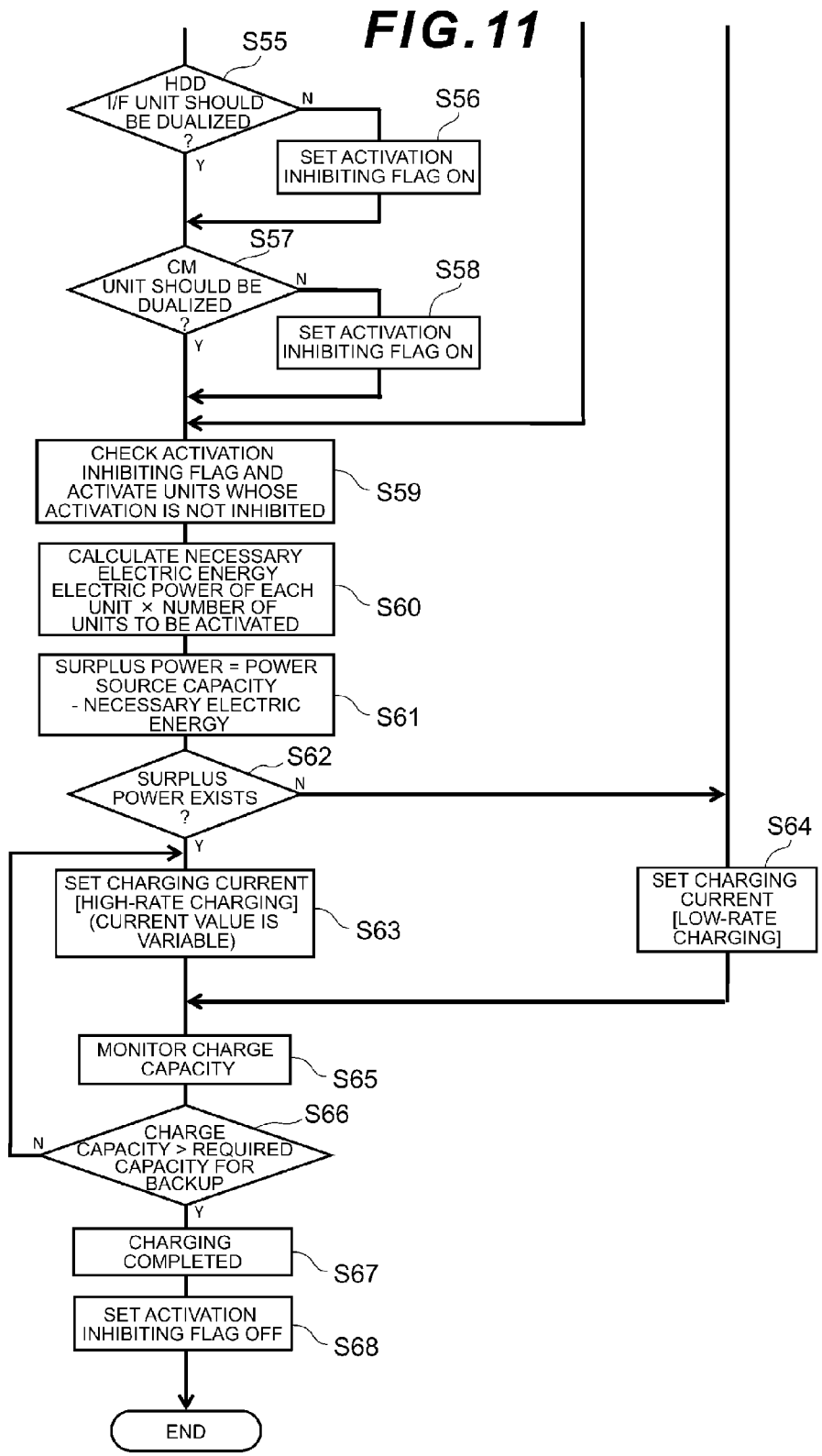
FIG. 11 is a flowchart illustrating the activation control processing.

Next, the content of activation control processing based on the user setting will be explained with reference to flowcharts in FIG. 10 and FIG. 11.

The activation control based on the user setting (the user setting information) is started (S41). If the supply of electric power from the power source unit 26 to each cluster 18, 20 is interrupted while the power source unit 26 is operating normally, the power source controller 62 detects the power interruption and transfers the power source information 102 indicating the occurrence of the power interruption to the main controller 66 (S42). As a result, the main controller 66 transfers control information indicating the occurrence of the power interruption to the data processing circuit 76 via the control line 106.

When the power interruption occurs, the data processing circuit 76 executes backup processing for saving data, which is stored in the cache memory 44, and information, which is stored in the shared memory 46, to the SSD 48 respectively (S43).

When the supply of the electric power is started after the interruption of the electric power supply from the power source unit 26 to each cluster 18, 20, the power source controller 62 detects the power recovery and transfers the power source information 102 indicating that the power source has entered a power recovery state, to the main controller 66 (S44). Incidentally, also in this case, the data processing circuits 64, 70, 72, 74, 76 can detect the supply of the electric power from the power supply line 100 and judge that the power has been recovered.

At the time of the power recovery, the main controller 66 searches the memory 68 and checks information that is set by the user (S45), and judges whether the battery charge is prioritized or not (S46). If it is determined that the battery charge is not prioritized, the processing proceeds to step S64; and if it is determined that the battery charge is prioritized, the main controller 66 reads the information in the configuration information field 406 from the unit management table 400 (S47).

Next, the main controller 66 judges whether or not only the battery 50 is to be charged, based on the information read from the configuration information field 406 (S48). If it is determined that only the battery 50 is to be charged, it is unnecessary to activate all the units (the microprocessor unit 40, the host interface unit 32, the HDD interface unit 34, the switch unit 36, and the memory unit 38), so that the main controller 66 sets the activation inhibiting flag on for all the units (S49) and proceeds to processing in step S59.

On the other hand, if it is determined in step 48 that not only the battery 50 is to be charged, the main controller 66 searches the memory 68 and checks the content of the user setting (S50), and judges whether it is necessary to dualize the microprocessor unit 40 or not, that is, whether the selection area 210 is selected or not (S51).

If it is determined in step S51 that it is unnecessary to dualize the microprocessor unit 40, the main controller 66 sets the activation inhibiting flag on for the microprocessor unit 40; and if it is determined that it is necessary to dualize the microprocessor unit 40, the main controller 66 judges whether it is necessary to dualize the host interface unit 32 or not, that is, whether the selection area 214 is selected or not (S53).

If it is determined in step S53 that it is unnecessary to dualize the host interface unit 32, the main controller 66 sets the activation inhibiting flag on for the host interface unit 32 (S54); and if it is determined that it is necessary to dualize the host interface unit 32, the main controller 66 judges whether it is necessary to dualize the HDD interface unit 34 or not, that is, whether the selection area 218 is selected or not (S55).

If it is determined in step S55 that it is unnecessary to dualize the HDD interface unit 34, the main controller 66 sets the activation inhibiting flag on for the HDD interface unit 34 (S56); and if it is determined that it is necessary to dualize the HDD interface unit 34, the main controller 66 judges whether it is necessary to dualize the cache memory 44 or not, that is, whether the selection area 222 is selected or not (S57).

If it is determined in step S57 that it is unnecessary to dualize the cache memory 44, the main controller 66 sets the activation inhibiting flag on for the cache memory 44 (S58); and if it is determined that it is necessary to dualize the cache memory 44, the main controller 66 checks the activation inhibiting flag of each unit and activates the units other than those to which the activation inhibiting flag is set on (the units for which it was determined in the processing in steps S51 through S57 that it is necessary to dualize them, and whose activation inhibiting flag is off) (S59).

When the above-described step is performed, the main controller 66 selects each unit, whose the activation inhibiting flag in the user setting information is off, as the activation target unit and turns on each selected activation target unit (i.e., turns on the switch located in the activation target unit).

As a result, the electric power is supplied from the power supply line 100 to each activation target unit, thereby activating each activation target unit.

Subsequently, the main controller 66 collects the power consumption by each activation target unit from the unit management table 400 as the necessary electric power to activate each activation target unit and calculates the necessary electric energy by multiplying the collected power consumption by the number of units to be activated (the number of the activation target units) (S60).

Next, the main controller 66 calculates surplus power of the power source from a difference between the power source capacity of the power source unit 26 and the necessary electric energy calculated in step S60 (S61).

The main controller 66 then judges whether any surplus power exists or not (S62). If it is determined that the surplus power exists, the main controller 66 sets a setting value of a charging current that can be supplied from the two power source units or one power source unit to the battery 50, based on the calculated surplus power (S63) and transfers information about this setting value to the battery controller 80. As a result, the battery controller 80 adjusts the output current of the charger 78 based on the setting value of the charging current, charges the battery 50 at a high rate, and increases the charging current for the battery 50.

On the other hand, if it is determined in step S62 that the surplus power does not exist or if it is determined in step S46 that the battery charge is not prioritized, the main controller 66 sets a setting value of a charging current that can be supplied from the power source unit 26 or the redundant power source unit 28 to the battery 50, based on the calculated surplus power (for example, the surplus power=0) (S64) and transfers information about this setting value to the battery controller 80. As a result, the battery controller 80 adjusts the output current of the charger 78 based on the setting value of the charging current where no surplus power exists; and charges the battery 50 at a low rate.

Subsequently, the battery controller 80 monitors the charge capacity of the battery 50 (S65) and judges whether the charge capacity of the battery 50 is not less than the necessary charge capacity (for example, not less than a threshold) to maintain the backup processing by the data processing circuit 76 (the backup processing for returning the data and information, which have been saved to the SSD 48, to the cache memory 44 and/or the shared memory 46) (S66). If it is determined that the charge capacity of the battery 50 is less than the charge capacity (less than the threshold) necessary for the backup processing by the data processing circuit 76, the processing returns to step S63; and if it is determined that the charge capacity of the battery 50 is not less than the charge capacity (not less than the threshold) necessary for the backup processing by the data processing circuit 76, the battery controller 80 completes charging of the battery 50 (S67).

After charging of the battery 50 by the battery controller 80 is completed, the main controller 66 sets the activation inhibiting flag off for each activation target unit (S68) and terminates the processing in this routine.

Figure 12:
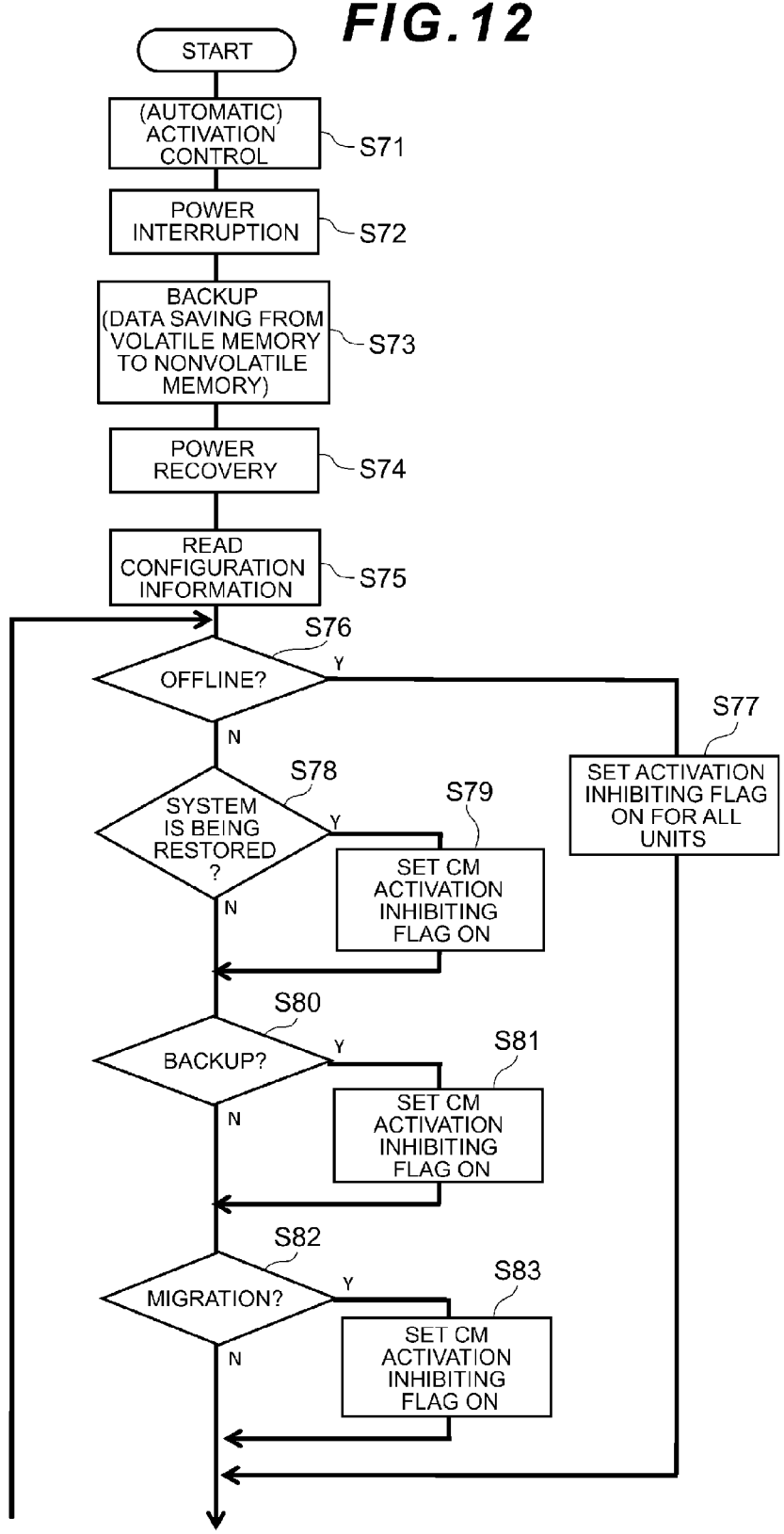
FIG. 12 is a flowchart illustrating automatic system setting processing.
Figure 13:
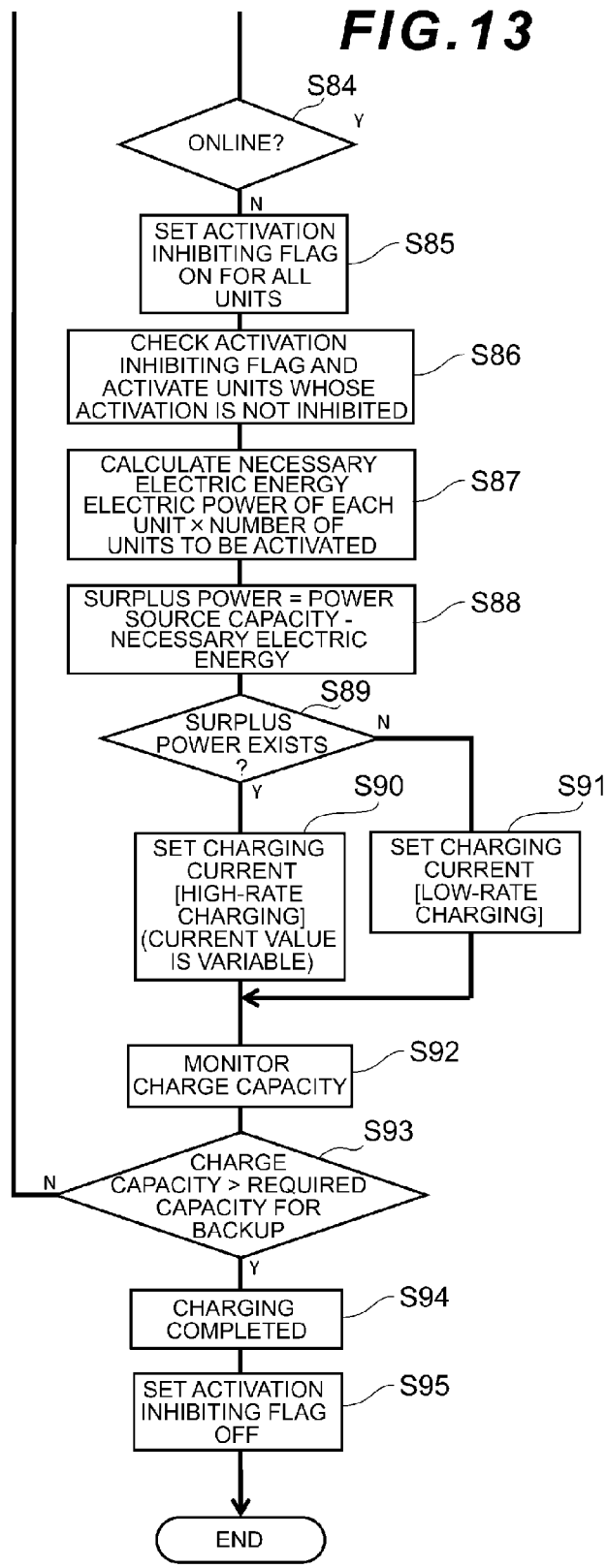
FIG. 13 is a flowchart illustrating the automatic system setting processing.

Next, the content of the activation control processing based on the automatic system setting will be explained with reference to flowcharts in FIG. 12 and FIG. 13.

Firstly, processing relating to the automatic system setting (automatic system setting information) is started (S71). If the supply of electric power from the power source unit 26 to each cluster 18, 20 is interrupted while the power source unit 26 is operating normally, the power source controller 62 detects the power interruption and transfers the power source information 102 indicating the occurrence of the power interruption to the main controller 66 (S42). As a result, the main controller 66 transfers control information indicating the occurrence of the power interruption to the data processing circuit 76 via the control line 106.

When the power interruption occurs, the data processing circuit 76 executes backup processing for saving data, which is stored in the cache memory 44, and information, which is stored in the shared memory 46, to the SSD 48 respectively (S73).

Next, when the supply of the electric power is started after the interruption of the electric power supply from the power source unit 26 to each cluster 18, 20, the power source controller 62 detects the power recovery and transfers the power source information 102 indicating that the power source has entered a power recovery state, to the main controller 66 (S74). Incidentally, also in this case, the data processing circuits 64, 70, 72, 74, 76 can detect the supply of the electric power from the power supply line 100 and judge that the power has been recovered.

At the time of the power recovery, the main controller 66 reads the configuration information stored in the shared memory 46 (S75) and judges whether the relevant processing is offline or not (S76).

If it is determined in step S76 that the relevant processing is offline, the main controller 66 searches the operation management table 300 in the memory 68, reads information from the entry 320, sets the activation inhibiting flag on for all the units (S77), and proceeds to processing in step S84; and if it is determined that the relevant processing is not offline, the main controller 66 judges whether the system is being restored or not (S78).

Next, if it is determined in step S78 that the system is being restored, the main controller 66 searches the operation management table 300, reads information from the entry 324, and sets the activation inhibiting flag on for the cache memory 44 (S79); and if it is determined that the system is not being restored, the main controller 66 judges whether or not the relevant processing is a backup to tapes (the backup processing) (S80).

If it is determined in step S80 that the relevant processing is a backup to tapes, the main controller 66 searches the operation management table 300, reads information from the entry 326, and sets the activation inhibiting flag on for the cache memory 44 (S81); and if it is determined that the relevant processing is not a backup to tapes, the main controller 66 judges whether the relevant processing is migration (migration processing) or not (S82).

Next, if it is determined in step S82 that the relevant processing is migration, the main controller 66 searches the operation management table 300, reads information from the entry 328, and sets the activation inhibiting flag on for the cache memory 44 (S83); and if it is determined that the relevant processing is not migration, the main controller 66 judges whether the relevant processing is online (online processing) or not (S84).

If it is determined in step S84 that the relevant processing is online, the main controller 66 proceeds to processing in step S86; and if it is determined that the relevant processing is not online, the main controller 66 sets the activation inhibiting flag on for all the units (S85), checks the activation inhibiting flag for all the units, and activates the units other than those to which the activation inhibiting flag is set on (S86).

When the above-described step is performed, the main controller 66 selects each unit, whose activation inhibiting flag in the automatic system setting information is off, as the activation target unit and turns on each selected activation target unit. As a result, the electric power is supplied from the power supply line 100 to each activation target unit, thereby activating each activation target unit.

Subsequently, the main controller 66 collects the power consumption by each activation target unit from the unit management table 400 as the necessary electric power to activate each activation target unit and calculates the necessary electric energy by multiplying the collected power consumption by the number of units to be activated (the number of the activation target units) (S87).

Next, the main controller 66 calculates surplus power of the power source from a difference between the power source capacity of the power source unit 26 and the necessary electric energy calculated in step S87 (S88).

Then, the main controller 66 judges whether any surplus power exists or not (S89). If it is determined that the surplus power exists, the main controller 66 sets a setting value of a charging current that can be supplied from the two power source units or one power source unit to the battery 50, based on the calculated surplus power (S90) and transfers information about this setting value to the battery controller 80. As a result, the battery controller 80 adjusts the output current of the charger 78 based on the setting value of the charging current, charges the battery 50 at a high rate, and increases the charging current for the battery 50.

On the other hand, if it is determined in step S89 that the surplus power does not exist, the main controller 66 sets a setting value of a charging current that can be supplied from the power source unit 26 or the redundant power source unit 28 to the battery 50, based on the calculated surplus power (for example, the surplus power=0) (S91) and transfers information about this setting value to the battery controller 80. As a result, the battery controller 80 adjusts the output current of the charger 78 based on the setting value of the charging current where no surplus power exists; and charges the battery 50 at a low rate.

Subsequently, the battery controller 80 monitors the charge capacity of the battery 50 (S92) and judges whether the charge capacity of the battery 50 is not less than the necessary charge capacity (for example, not less than a threshold) to maintain the backup processing by the data processing circuit 76 (S93). If it is determined that the charge capacity of the battery 50 is less than the charge capacity (less than the threshold) necessary for the backup processing by the data processing circuit 76, the processing returns to step S76; and if it is determined that the charge capacity of the battery 50 is not less than the charge capacity (not less than the threshold) necessary for the backup processing by the data processing circuit 76, the battery controller 80 completes charging of the battery 50 (S94).

After charging of the battery 50 by the battery controller 80 is completed, the main controller 66 sets the activation inhibiting flag off for each activation target unit (S95) and terminates the processing in this routine.

According to this embodiment, the activation target unit(s) to be activated is selected and activated from among a plurality of units belonging to the control unit 30; the surplus power is produced by the power source unit 26 by reducing the power consumption by the entire storage apparatus than a case where all the units are activated as the activation target units; and this surplus power is used to increase the charging current for the battery 50. Therefore, it is possible to increase the charge capacity and the charging current of the battery 50 without increasing the power source capacity of the power source unit 26 and reduce the charge time for the battery 50.

Second Embodiment

This embodiment is designed to control the activation of each unit by dividing it into a plurality of states and control the charging current for the battery according to each state.

Figure 14:
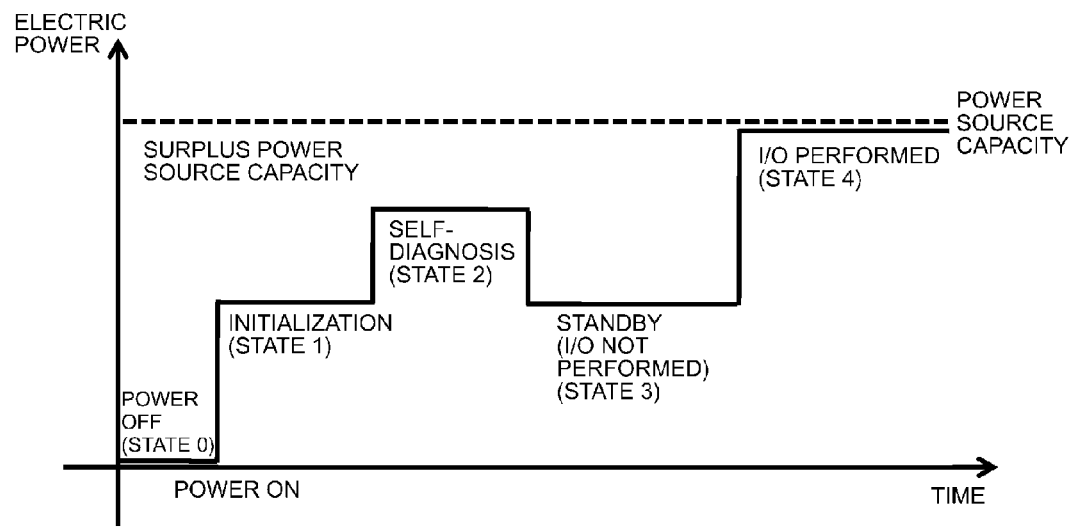
FIG. 14 is a state transition diagram explaining an activation states of a unit.

Specifically speaking, in the process of activating each unit, the activation of each unit can be controlled by dividing it along the time axis into an initialization state (state 1), self-diagnostic state (state 2), a standby state (state 3) in which I/O processing (data input/output processing) is not performed, and an I/O processing state (state 4) in which I/O processing is performed, as shown in FIG. 14.

So, the main controller 66 controls the activation of each unit by dividing it into four states and monitors the status of each unit. Under this circumstance, the main controller 66 previously calculates the power consumption by each unit in each state (from state 1 to state 4) and stores each calculation result in the status management table in the memory 68.

Next, FIG. 15 shows the configuration of a status management table 500.

The status management table 500 includes a unit type field 502, a stop field 504, a state 1 field 506, a state 2 field 508, a state 3 field 510, a state 4 field 512, and a status field 514.

Each entry in the unit type field 502 stores information about the name of each unit. For example, entry 520 stores MP as the name of the microprocessor unit 40, entry 522 stores CHA-A as the name of the host interface unit 32 belonging to the cluster 18, and entry 524 stores information indicating CHA-B as the name of the host interface unit 32 belonging to the cluster 20.

Entry 526 stores information indicating DKA as the name of each HDD interface unit 34. Entry 528 stores information indicating SW as the name of the switch unit 36, and entry 530 stores information indicating CM as the name of the cache memory 44.

Entry 532 stores information indicating SVP as the name of the maintenance PC 52. Entry 534 stores information indicating FAN as the name of a cooler for cooling each unit.

Each entry in the stop field 504 stores 0 as information indicating that the power source is not supplied to each unit. Each entry in the state 1 field 506, the state 2 field 508, the state 3 field 510, and the state 4 field 512 stores a numerical value indicating information about the power consumption by each unit in the initialization state, the self-diagnostic state, the standby state, and the I/O processing state.

For example, the entry 520 stores 50, 75, 50, and 100 as the power consumption in the state 1 to the state 4.

Each entry in the status field 514 stores information about the status of each unit. For example, if the unit in a stop state, the status field 514 stores information indicating Stop. If the unit is in the initialization state, the status field 514 stores information indicating State 1. If the unit is in the self-diagnostic state, the status field 514 stores information indicating State 2. If the unit is in the standby state, the status field 514 stores information indicating State 3. If the unit is in the I/O processing state, the status field 514 stores information indicating State 4.

Figure 16:
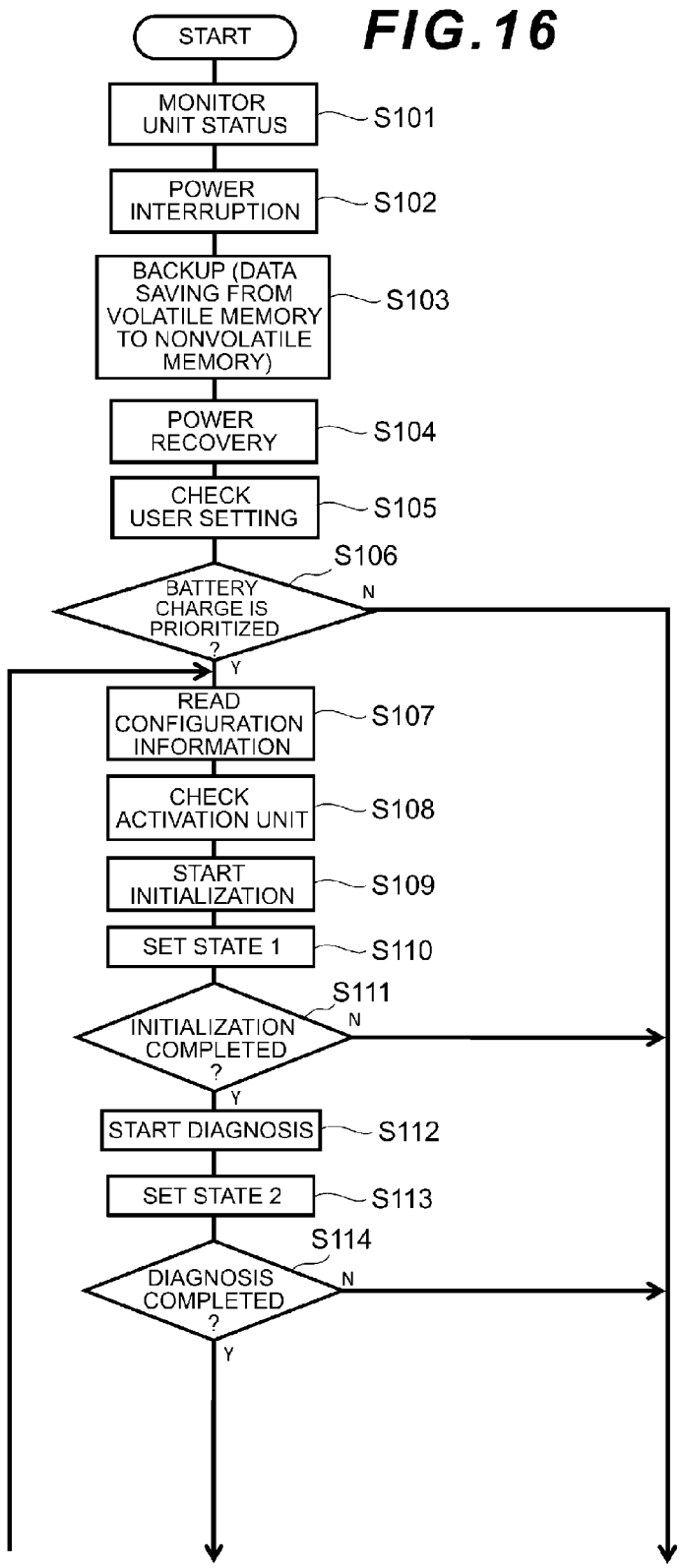
FIG. 16 is a flowchart illustrating unit status processing.
Figure 17:
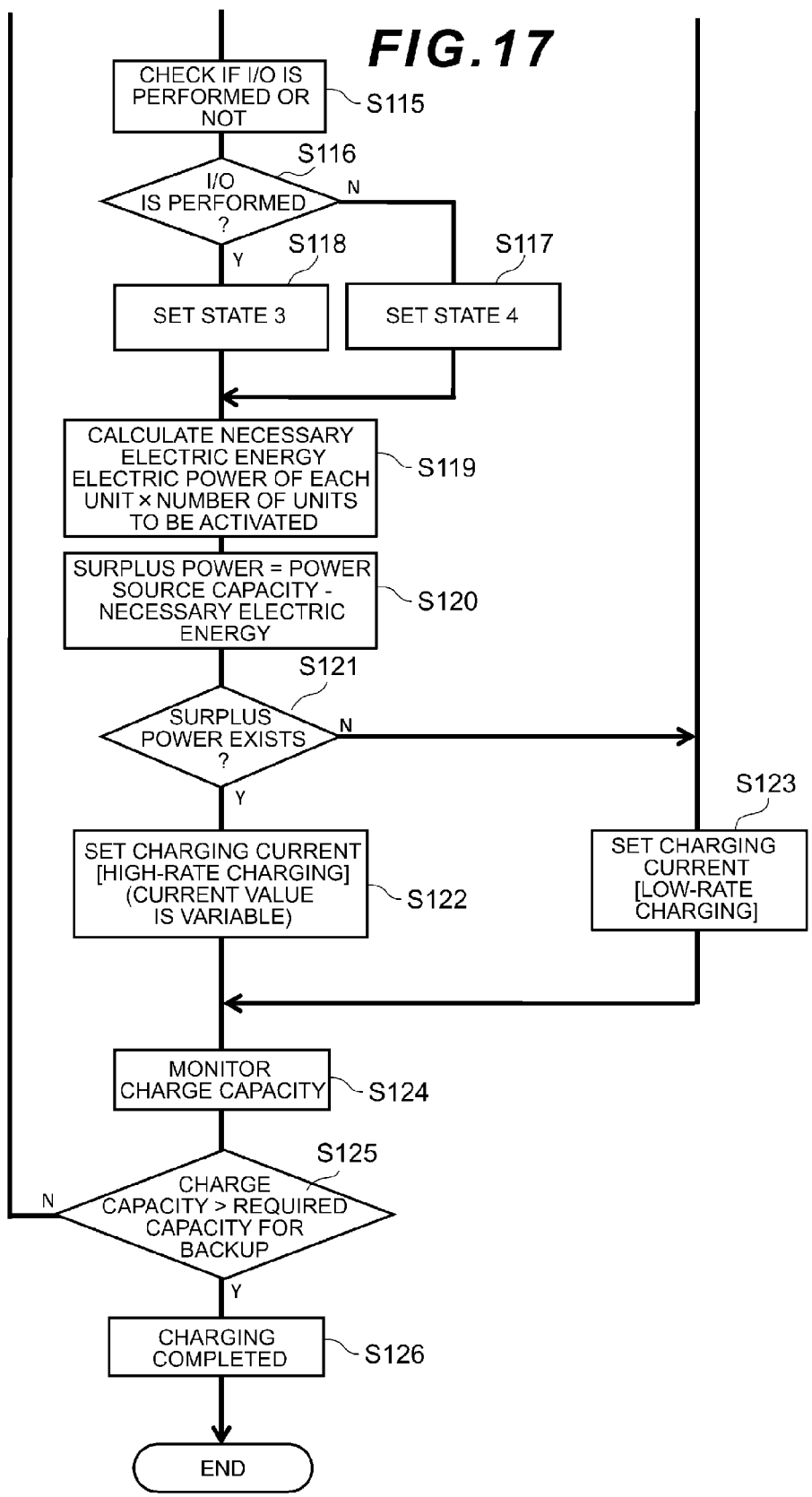
FIG. 17 is a flowchart illustrating the unit status processing.

Next, the content of the unit status control processing will be explained with reference to flowcharts in FIG. 16 and FIG. 17.

Firstly, the main controller 66 starts monitoring the unit status (S101). If the supply of electric power from the power source unit 26 to each cluster 18, 20 is interrupted while the power source unit 26 is operating normally, the power source controller 62 detects the power interruption and transfers the power source information 102 indicating the occurrence of the power interruption to the main controller 66 (S102).

As a result, the main controller 66 transfers control information indicating the occurrence of the power interruption to the data processing circuit 76 via the control line 106. Incidentally, the data processing circuits 64, 70, 72, 74, 76 can detect interruption of the supply of the electric power from the power supply line 100 and judge that the power interruption has occurred.

When the power interruption occurs, the data processing circuit 76 executes backup processing for saving data, which is stored in the cache memory 44, and information, which is stored in the shared memory 46, to the SSD 48 respectively (S103).

Next, when the supply of the electric power is started after the interruption of the electric power supply from the power source unit 26 to each cluster 18, 20, the power source controller 62 detects the power recovery and transfers the power source information 102 indicating that the power source has entered a power recovery state, to the main controller 66 (S104). Incidentally, the data processing circuits 64, 70, 72, 74, 76 can detect the supply of the electric power from the power supply line 100 and judge that the power has been recovered.

At the time of the power recovery, the main controller 66 searches the memory 68 and checks information that is set by the user (S105), and judges whether the battery charge is prioritized or not (S106). If it is determined that the battery charge is not prioritized, the processing proceeds to step S123; and if it is determined that the battery charge is prioritized, the main controller 66 reads the information in the configuration information field 406 from the unit management table 400 (S107).

Next, the main controller 66 checks the activation target unit to be activated (S108), starts the initialization of the activation target unit (S109), sets the status of the activation target unit to state 1 (S110), and judges whether the initialization has been completed or not (S111).

If it is determined in step S111 that the initialization has not been completed, the main controller 66 proceeds to processing in step S123; and if it is determined that the initialization has been completed, the main controller 66 starts self-diagnosis processing on the activation target unit (S112).

Subsequently, the main controller 66 sets the status of the activation target unit to state 2 (S113) and judges whether the diagnosis (self-diagnosis processing) has been completed or not (S114). If it is determined that the diagnosis has not been completed, the processing proceeds to step S123; and if it is determined that the diagnosis has been completed, the main controller 66 checks whether or not the I/O processing is performed on the activation target unit (S115) and judges whether or not the I/O processing is performed (S116).

If it is determined in step S116 that the I/O processing is not performed and the activation target unit is in the standby state, the main controller 66 sets the status of the activation target unit to state 3 (S117); and if it is determined in step S116 that the I/O processing is performed, the main controller 66 sets the status of the activation target unit to state 4 (S118).

Next, the main controller 66 collects the power consumption by each activation target unit from the unit management table 400 as the necessary electric power to activate each activation target unit and calculates the necessary electric energy by multiplying the collected power consumption by the number of units to be activated (the number of the activation target units) (S119).

Subsequently, the main controller 66 calculates surplus power of the power source from a difference between the power source capacity of the power source unit 26 and the necessary electric energy calculated in step S119 (S120).

The main controller 66 then judges whether any surplus power exists or not (S121). If it is determined that the surplus power exists, the main controller 66 sets a setting value of a charging current that can be supplied from the two power source units or one power source unit to the battery 50, based on the calculated surplus power (S122) and transfers information about this setting value to the battery controller 80. As a result, the battery controller 80 adjusts the output current of the charger 78 based on the setting value of the charging current, charges the battery 50 at a high rate, and increases the charging current for the battery 50.

On the other hand, if it is determined in step S121 that the surplus power does not exist or if it is determined in step S106 that the battery charge is not prioritized, the main controller 66 sets a setting value of a charging current that can be supplied from the power source unit 26 or the redundant power source unit 28 to the battery 50, based on the calculated surplus power (for example, the surplus power=0) (S123) and transfers information about this setting value to the battery controller 80. As a result, the battery controller 80 adjusts the output current of the charger 78 based on the setting value of the charging current where no surplus power exists; and charges the battery 50 at a low rate.

Subsequently, the battery controller 80 monitors the charge capacity of the battery 50 (S124) and judges whether the charge capacity of the battery 50 is not less than the necessary charge capacity (for example, not less than a threshold) to maintain the backup processing by the data processing circuit 76 (S125). If it is determined that the charge capacity of the battery 50 is less than the charge capacity (less than the threshold) necessary for the backup processing by the data processing circuit 76, the processing returns to step S108; and if it is determined that the charge capacity of the battery 50 is not less than the charge capacity (not less than the threshold) necessary for the backup processing by the data processing circuit 76 (the backup processing for returning the data and information, which have been saved to the SSD 48, to the volatile memory), the battery controller 80 completes charging of the battery 50 (S126) and terminates the processing in this routine.

In this embodiment, the main controller 66 controls the activation of the activation target unit by dividing it along the time axis into four states, calculates the total power consumption by the activation target unit in each state, calculates the surplus power of the activation target unit in each state based on a difference between each calculated total power consumption and the power source capacity of the power source unit 26, and transfers each calculation result to the battery controller 80; and the battery controller 80 sets a setting value of the charging current that can be supplied from the power source unit 26 to the battery 50, based from the calculation result transferred from the main controller 66 by associating the setting value with each state, sets a larger value to each setting value as the calculated surplus power becomes larger, and controls the charging current to the battery 50 according to each setting value which has been set.

If under the above-described circumstance the main controller 66 calculates, as the surplus power of each unit in each state, the surplus power in the initialization state and the surplus power in the data input/output processing standby state as being larger than the surplus power in other states, that is, the surplus power in the self-diagnostic state and the data input/output processing state, the battery controller 80 sets the setting values associated with the initialization state and the data input/output processing standby state, from among the setting value associated with each state, so as to make them larger than the setting values associated with other states. As a result, when each unit enters the initialization state and the data input/output processing standby state, the charging current for the battery 50 can be increased more than that in other states.

Since only the activation target unit(s) to be activated from among the plurality of units belonging to the control unit 30 is selected and activated according to this embodiment, the charging current and the charge capacity of the battery 50 can be increased without increasing the power source capacity of the power source unit 26 and the charge time for the battery 50 can be reduced.

Furthermore, according to this embodiment, the activation of each unit can be controlled by dividing it into a plurality of states and the charging current for the battery 50 can be controlled according to each state.

Third Embodiment

This embodiment is designed to increase the charging current for the battery 50 based on surplus power produced and obtained by using the redundant power source unit 28 which is the redundant power source.

The redundant power source such as the redundant power source unit 28 is usually used when abnormality occurs in the power source unit 26. A case where the power source unit 26 and the redundant power source unit 28 are prepared in a one-to-one combination is called a one-to-one redundant configuration; and a case where one redundant power source is prepared as a spare for a plurality of main power sources is sometimes called a n+1 redundant configuration. If the one-to-one redundant configuration or the n+1 redundant configuration is adopted, the charging current for the battery 50 can be increased by using the power source capacity by the redundant power source.

Under the above-described circumstance, even in a case where abnormality occurs in any of the power source units during high-rate charging, the battery 50 can be charged without overflow of the power source capacity of the power source unit by accelerating a monitoring cycle of an alternating voltage to be input to the ac/dc converter 60.

Specifically speaking, the power source capacity equivalent to the power source capacity of the power source unit 26 is set to the redundant power source unit 28 so that a specified current can be supplied from the redundant power source unit 28 to each unit by using the redundant power source unit 28 even if abnormality occurs in the power source unit 26.

Furthermore, this embodiment is designed so that if an AC input to the power source unit 26 and the redundant power source unit 28 is interrupted, the battery 50 is charged at a low rate until each power source unit runs short of the power source capacity and stops due to a load increase.

Figure 18:
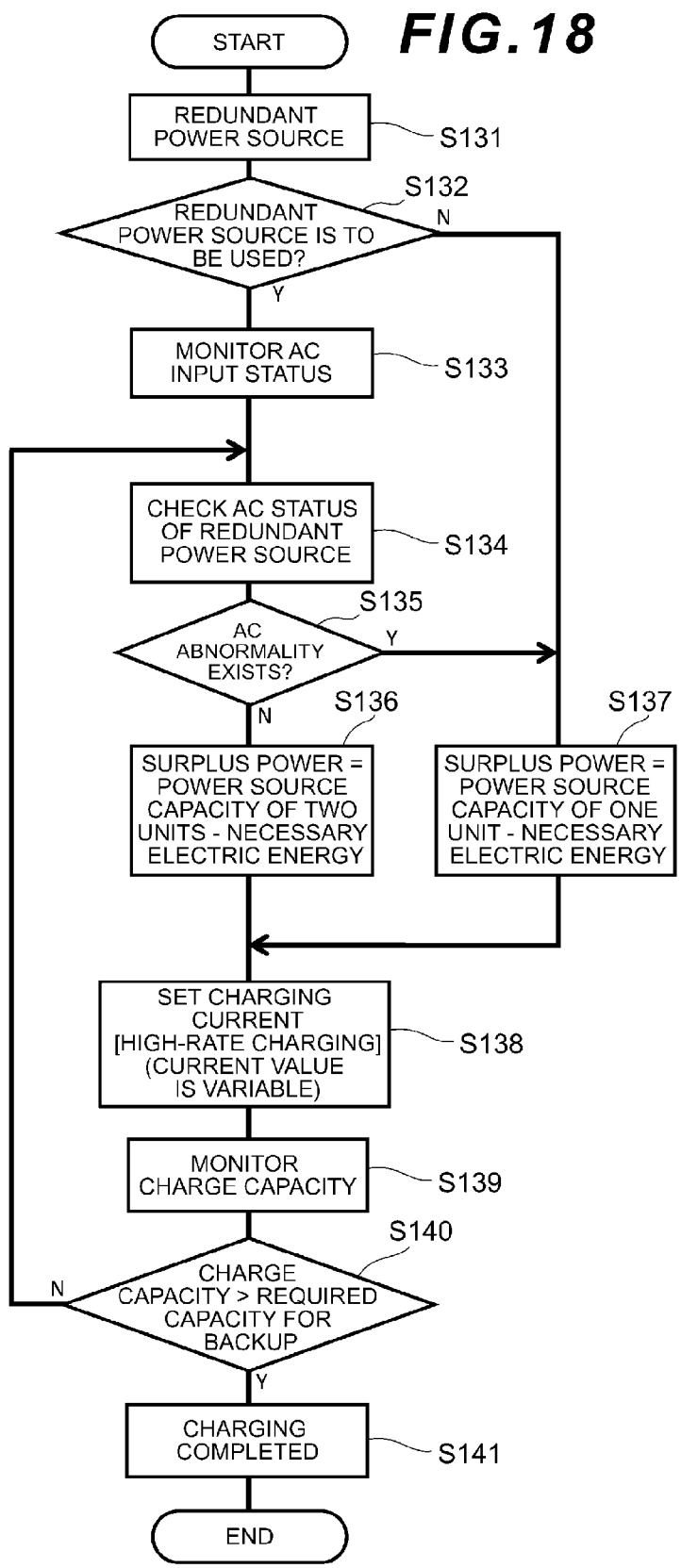
FIG. 18 is a flowchart illustrating processing using a redundant power source.

Next, the content of processing using the redundant power source will be explained with reference to a flowchart in FIG. 18.

Firstly, the main controller 66 starts the processing using the redundant power source unit 28 as the redundant power source and judges whether the redundant power source unit 28 is to be used as the redundant power source or not (S132). If it is determined that the redundant power source unit 28 is not to be used, the processing proceeds to step S137; and if it is determined that the redundant power source unit 28 is to be used, the main controller 66 monitors the AC input status and sets this monitoring cycle as a polling cycle (S133).

The polling cycle herein used means a shorter cycle than a period of time between interruption time when the alternating current which is input to the power source unit 26 or the redundant power source unit 28 is interrupted, and decrease start time when a direct current which is output from the power source unit 26 or the redundant power source unit 28 decreases from a specified value.

If the AC input status is monitored in this polling cycle, it is possible to detect abnormality in the power source units 26, 28 and transfer the abnormality detection output to the data processing circuits 64 and the main controller 66 at a timing after the interruption time, when the alternating current input to the power source unit 28 is interrupted, and before the decrease start time when the direct current of the ac/dc converter 60 decreases from the specified value (specified direct current).

If abnormality occurs in either one of the power source units 26, 28 and the main controller 66 detects the occurrence of this abnormality in the polling cycle, the battery controller 80 can switch charging of the battery 50 from the high rate to the low rate on the basis of the information from the main controller 66 before the output current of the ac/dc converter 60 decreases from the specified value.

If abnormality occurs in the power source unit 26 or the redundant power source unit 28 and charging the battery 50 from the normal power source unit continues at the high rate, the power source capacity of the normal power source unit will overflow. So, the above-described switching is performed in order to prevent the power source capacity from exceeding a specified value.

Next, the main controller 66 checks the AC status (the alternating current or the AC power) of the redundant power source unit 28 (S134) and judges whether or not abnormality exists in the AC status (S135). If it is determined that abnormality does not exist, the main controller 66 recognizes that both the power source units 26, 28 operate normally, and calculates the surplus power of both the power source units from a difference between the power source capacity of the two units and the necessary electric energy (S136).

On the other hand, if it is determined that abnormality exists in the AC, that is, if it is determined that abnormality has occurred in either one of the power source units, the main controller 66 calculates the surplus power of the normal power source unit from a difference between the power source capacity of the normal power source unit and the necessary electric energy (S137). In this case, abnormality of the power source is detected in the polling cycle, so that the battery 50 can be charged from the normal power source unit without overflow of the power source capacity of the normal power source unit.

Next, the main controller 66 sets a setting value of a charging current that can be supplied from the two power source units or one power source unit to the battery 50, based on the calculated surplus power (S138) and transfers information about this setting value to the battery controller 80. As a result, the battery controller 80 adjusts the output current of the charger 78 based on the setting value of the charging current, charges the battery 50 at a high rate, and increases the charging current for the battery 50.

Subsequently, the battery controller 80 monitors the charge capacity of the battery 50 (S139) and judges whether the charge capacity of the battery 50 is not less than the necessary charge capacity (for example, not less than a threshold) to maintain the backup processing by the data processing circuit 76 (S140). If it is determined that the charge capacity of the battery 50 is less than the charge capacity (less than the threshold) necessary for the backup processing by the data processing circuit 76, the processing returns to step S134; and if it is determined that the charge capacity of the battery 50 is not less than the charge capacity (not less than the threshold) necessary for the backup processing by the data processing circuit 76 (the backup processing for returning the data and information, which have been saved to the SSD 48, to the volatile memory), the battery controller 80 completes charging of the battery 50 (S141) and terminates the processing in this routine.

According to this embodiment, the surplus power is produced by using the redundant power source unit 28. So, the charging current and the charge capacity of the battery 50 can be increased and the charge time for the battery 50 can be reduced without increasing the power source capacity of the power source unit 26.

This embodiment is designed so that if abnormality occurs in either one of the power source units 26, 28, the occurrence of this abnormality is detected in the polling cycle and charging of the battery 50 is switched from the high rate to the low rate. As a result, it is possible to prevent the power source capacity of the normal power source unit from overflowing.

Figure 19:
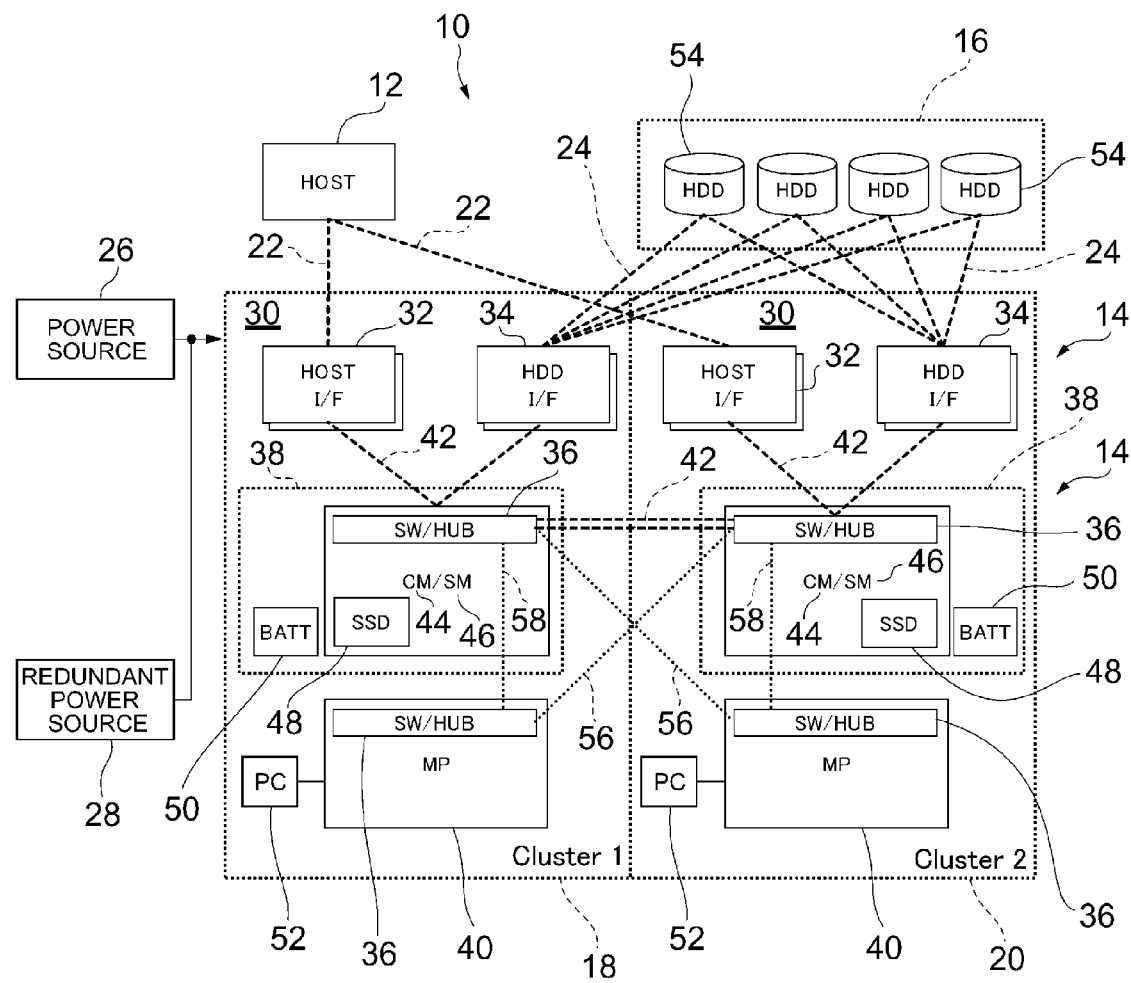
FIG. 19 is a block configuration diagram showing another configuration of the storage system.

Next, FIG. 19 shows another configuration of the storage system 10.

This embodiment is configured so that the switch unit 36 is located in each of the memory unit 38 and the microprocessor unit 40 for the cluster 18, 20; and the switch unit 36 located in the memory unit 38 is connected via the data bus 42 to the host interface unit 32 and the HDD interface unit 34, and the switch units 36 in the respective memory units 38 are connected to each other via the data bus 42, and the switch unit 36 for the memory unit 38 and the switch unit 36 for the microprocessor unit 40 are connected to each other via data buses 56, 58. Other components are the same as those in FIG. 1.

According to this embodiment, the same advantageous effects as those in each of the aforementioned embodiments can be obtained by executing the processing in the first embodiment through the third embodiment.

Figure 20:
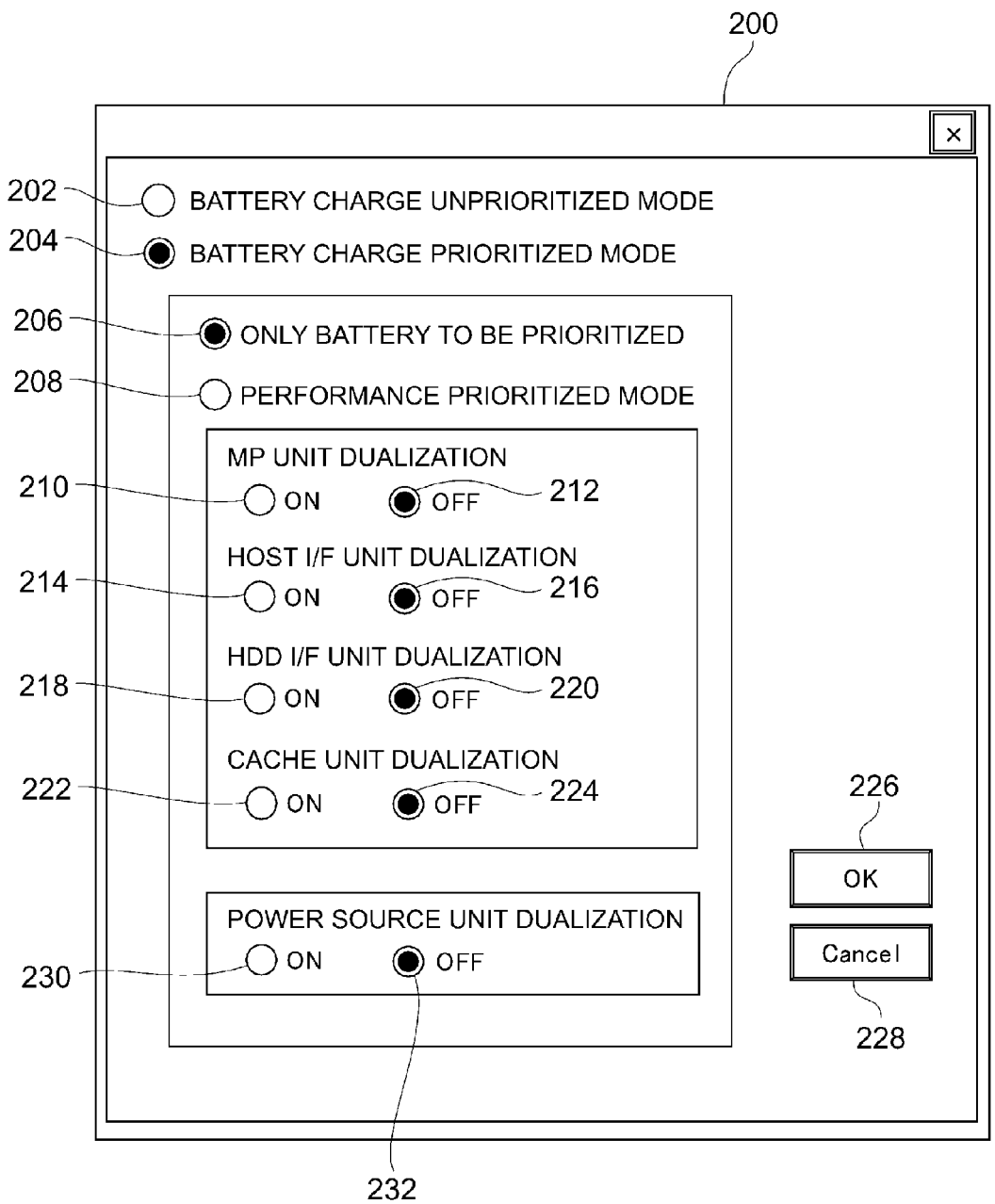
FIG. 20 is a configuration diagram showing another display example for the user setting screen.

Next, FIG. 20 shows another configuration of a user setting screen for the maintenance PC.

Referring to FIG. 20, a user setting screen 200 is configured as a screen for selecting a battery charge mode at the time of power recovery of the power source unit 60 after power interruption and is also configured as a screen for selecting the redundant power source.

Specifically speaking, the user setting screen 200 includes: a selection area 202 for selecting a Battery Charge Unprioritized Mode; a selection area 204 for selecting a Battery Charge Prioritized Mode; a selection area 206 for selecting an Only Battery To Be Prioritized; and a selection area 208 for selecting a Performance Prioritized Mode.

As selection areas to be used when the Performance Prioritized Mode is selected in the selection area 208, an ON selection area 210 and an OFF selection area 212 are provided for dualization of the microprocessor unit 40 and an ON selection area 214 and an OFF selection area 216 are provided for dualization of the host interface unit 32. Also, an ON selection area 218 and an OFF selection area 220 are provided for dualization of the HDD interface unit 34. An ON selection area 222 and an OFF selection area 224 are provided for dualization of the cache memory 44.

Furthermore, an ON selection area 230 in a case where the dualization of the power source unit is selected, and an OFF selection area 232 in a case where the dualization of the power source unit is not selected are provided as areas for selecting the redundant power source unit 28 besides the power source unit 26 and selecting whether the power source unit should be dualized or not.

The user can select an OK button 226 when they confirm the selected area; and the user can select a cancellation button 228 when they cancel the selected area.

Information that is set by the user selecting and setting the selection areas on the user setting screen 200 is transferred via the control line 110 to the main controller 66 and stored in the memory 68.

In each of the aforementioned embodiments, the data processing circuit 64 can be integrated with the main controller 66 and the functions of the power source controller 62 and/or the functions of the battery controller 80 can be added to the main controller 66.

In each of the aforementioned embodiments, the data processing circuit 64 can be integrated with the memory 68 and the cache memory 44 and the shared memory 46 can be configured independently from the control unit 30.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment can be deleted, or added to, or replaced with, the configuration of another configuration.

Furthermore, part or all of the aforementioned configurations, functions, processing units, and so on may be realized by hardware by, for example, designing them in integrated circuits. Also, each of the aforementioned configurations, functions, and so on may be realized by software by the processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

Furthermore, control lines and information lines are indicated only when they are considered necessary for explanation and not all the control lines and information lines required for products are always indicated. Actually, it may be considered that almost all the components are mutually connected.

REFERENCE SIGNS LIST

10 Storage system
12 Host computer
14 Storage apparatus
16 Storage device
18, 20 Clusters
22, 24 Networks
30 Control unit
32 Host interface unit
34 HDD interface unit
36 Switch unit
38 Memory unit
40 Microprocessor unit
44 Cache memory
46 Shared memory
48 SSD
50 Battery
64 Microprocessor
66 Main processor
68 Memory
70, 72, 74, 76 Data processing circuits 78 Charger
80 Battery controller

The invention claimed is:

1. A storage apparatus comprising:
a storage device for storing data;
one or more control units configured by combining a plurality of units configured to become loaded on, at least one of: a power source or a redundant power source, the one or more control units for controlling data input or output processing on the storage device based on an access request from an access requestor;
one or more volatile memories for storing data or information relating to processing by the control unit;
a nonvolatile memory comprising a save location for at least either data or information stored in the one or more volatile memory;
a battery configured to be charged by receiving electric power supplied from, at least one of: the power source or the redundant power source, and configured to supply the charged power to the volatile memory and the nonvolatile memory;
a main controller, wherein, when the electric power is supplied to the control unit after interruption of the electric power supply to the control unit, the main controller is configured to:
select at least one activation target unit, which is to be activated, from among the plurality of units belonging to the control unit;
control the activation of the selected at least one activation target unit;
calculate a total power consumption by the selected at least one activation target unit and a power consumption previously determined for each type of the selected at least one activation target unit; and
set a charging current supplied from the power source to the battery based on surplus power indicating a difference between the calculated total power consumption by the selected activation unit and a capacity of, at least one of: the power source or the redundant power source;
wherein abnormality in the power source or the redundant power source is judged in a shorter cycle than a period of time between interruption time when an alternating current input to the power source or the redundant power source is interrupted, and decrease start time when a direct current output from the power source or the redundant power source decreases from a specified value,
wherein, when it is determined that one of the power source and the redundant power source is normal and the other is abnormal, the main controller is further configured to:
calculate surplus power from a difference between the total power consumption by the selected at least one activation target unit and the capacity of the normal power source, which is either the power source or the redundant power source, and transfer the calculation result to the battery controller; and
detect abnormalities in the power source, redundant power source, and AC inputs of the power source and redundant power source, wherein when an abnormality is detected, the main controller is further configured to control the charging current based on a supply amount from the normal power source; and
calculate surplus power indicating a difference between total power consumption by the selected at least one activation target unit and a capacity of the power source and the redundant power source and transfer the calculation result to the battery controller; and
a battery controller configured to:
control a charging current, based on a set charging current, and based on surplus power indicating a difference between total power consumption by the selected at least one activation target unit and a capacity of the power source and the redundant power source; and
set a setting value of the charging current, which can be supplied from the power source and the redundant power source to the battery, based on the calculation result calculated by the main controller and control the charging current for the battery according to the setting value which has been set.

2. The storage apparatus according to claim 1, wherein the main controller is further configured to calculate the surplus power indicating the difference between the total power consumption by the selected at least one activation target unit and the capacity of the power source and transfer the calculation result to the battery controller; and
wherein the battery controller is configured to set a setting value of the charging current that can be supplied to from the power source to the battery, based on the surplus power calculated by the main controller and control the charging current to the battery according to the setting value which has been set.

3. The storage apparatus according to claim 1, wherein the main controller is further configured to:
control the activation of the selected at least one activation target unit by dividing the activation into a plurality of states along a time axis,
calculate the total power consumption by the selected at least one activation target unit in each state,
calculate surplus power of the selected at least one activation target unit in each state based on a difference between each calculated total power consumption and the capacity of the power source, and
transfer each calculation result to the battery controller;
wherein the battery controller is configured to:
set a setting value of the charging current, which can be supplied from the power source to the battery, based on the calculation result transferred from the main controller by associating the setting value of the charging current with each state,
set a large value to each setting value according to the size of the calculated surplus power, and
control the charging current to the battery according to each setting value which has been set.

4. The storage apparatus according to claim 3,
wherein the main controller is further configured to control the activation of the selected at least one activation target unit by dividing it into an initialization state, a self-diagnostic state, a data input/output processing standby state, and a data input/output processing state;
wherein the battery controller is further configured to set a larger value to the setting value corresponding to the initialization state and the data input/output processing standby state, from among the setting value corresponding to each state, than the setting values corresponding to other states.

5. The storage apparatus according to claim 1, wherein the main controller is further configured to select the at least one activation target unit in accordance with user setting information or automatic system setting information.

6. The storage apparatus according to claim 1,
wherein the battery controller is configured to monitor a charge capacity of the battery;
wherein, when the charge capacity of the battery becomes equal to or more than a charge capacity necessary to return at least either the data or information stored in the nonvolatile memory to the volatile memory, the battery controller is configured to stop supplying the charging current from the power source to the battery.

7. The storage apparatus according to claim 1,
wherein the nonvolatile memory comprises a cache memory for temporarily storing data involved in the processing by the control unit, and a shared memory for storing information to manage the cache memory;
wherein the nonvolatile memory is configured as a storage area for saving data stored in the cache memory and information stored in the shared memory; and
wherein the control unit comprises:
   a microprocessor unit for supervising and controlling the entire control unit as the plurality of units;
   a host interface unit for sending and receiving information via a host computer, which is the access requestor, and a network;
   an HDD interface unit connected to the storage device, for sending data to, and receiving data from, the storage device; and
   a switch unit for mutually connecting the microprocessor unit, the host interface unit, the HDD interface unit, the cache memory, and the shared memory.

8. A method for controlling a storage apparatus, the method comprising:
   controlling, by one or more control units of a plurality of units which become loaded on a power source, data input or output processing on a storage device for storing data, based on an access request from an access requestor;
   saving, in a save location of a nonvolatile memory, at least either data or information stored in one or more volatile memories for storing data or information relating to processing by the control unit;
   charging a battery by receiving electric power supplied from the power source;
   supplying the charged power to the volatile memory and the nonvolatile memory;
   when the electric power is supplied from the power source to the control unit after interruption of the electric power supply from the power source to the control unit, selecting, by a main controller, at least one activation target unit, which is to be activated, from among the plurality of units belonging to the control unit, and controlling the activation of the selected at least one activation target unit; and
   controlling, by a battery controller, a charging current supplied from the power source to the battery based on surplus power indicating a difference between total power consumption by the selected activation target unit and a capacity of the power source;
   calculating, by the main controller, a total power consumption by the selected at least one activation target unit and a power consumption previously determined for each type of the selected at least one activation target unit; and
   setting, by the main controller, a charging current supplied from the power source to the battery based on surplus power indicating a difference between the calculated total power consumption by the selected activation unit and a capacity of the power source;
   calculating, by the main controller, the surplus power indicating the difference between the total power consumption by the selected at least one activation target unit and the capacity of the power source and transferring the calculation result to the battery controller;
   setting, by the battery controller, a setting value of the charging current, which can be supplied from the power source to the battery, based on the surplus power calculated by the main controller; and
   controlling, by the battery controller, the charging current based on a set charging current,
   wherein, when it is determined that one of the power source and the redundant power source is normal and the other is abnormal, the main controller:
      calculates surplus power from a difference between the total power consumption by the selected at least one activation target unit and the capacity of the normal power source, and transfers the calculation result to the battery controller; and
      detects, by the main controller, abnormalities in the power source, redundant power source, and AC inputs of the power source, wherein when an abnormality is detected, the main controller is further configured to control the charging current based on the supply amount from the normal power source,
   wherein abnormality in the power source or the redundant power source is judged in a shorter cycle than a period of time between interruption time when an alternating current input to the power source or the redundant power source is interrupted, and decrease start time when a direct current output from the power source or the redundant power source decreases from a specified value;
   calculating, by the main controller, surplus power indicating a difference between total power consumption by the selected at least one activation target unit and a capacity of the power source and the redundant power source and transfer the calculation result to the battery controller; and
   controlling, by a battery controller, a charging current, based on a set charging current, and based on surplus power indicating a difference between total power consumption by the selected at least one activation target unit and a capacity of the power source and the redundant power source,
   wherein the setting value of the charging current is further based on the calculation result calculated by the main controller.

9. The storage apparatus control method according to claim 8, further comprising:
   controlling, by the main controller, the activation of the selected at least one activation target unit by dividing the activation into a plurality of states along a time axis;
   calculating, by the main controller, the total power consumption by the selected at least one activation target unit in each state;
   calculating, by the main controller, surplus power of the selected at least one activation target unit in each state based on a difference between each calculated total power consumption and the capacity of the power source;
   transferring, by the main controller, each calculation result to the battery controller;
   setting, by the battery controller, a setting value of the charging current, which can be supplied from the power source to the battery, based on the calculation result transferred from the main controller by associating the setting value of the charging current with each state and setting a large value to each setting value according to the size of the calculated surplus power; and controlling, by the battery controller, the charging current to the battery according to each setting value which has been set.

10. The storage apparatus control method according to claim 9, further comprising:

controlling, by the main controller, the activation of the selected at least one activation target unit by dividing it into an initialization state, a self-diagnostic state, a data input/output processing standby state, and a data input/output processing state; and setting, by the battery controller, a larger value to the setting value corresponding to the initialization state and the data input/output processing standby state, from among the setting value corresponding to each state, than the setting values corresponding to other states.

11. The storage apparatus control method according to claim 8, further comprising:

when the control unit and the battery are connected to the power source as well as a redundant power source, controlling, by the battery controller, the charging current supplied to the battery based on surplus power indicating a difference between total power consumption by the selected at least one activation target unit and a capacity of the power source and the redundant power source.

* * * * *